United States Patent
Ojard et al.

(10) Patent No.: US 7,684,528 B2
(45) Date of Patent: *Mar. 23, 2010

(54) METHOD FOR WHITENING COLORED NOISE IN A COMMUNICATION SYSTEM

(75) Inventors: Eric Ojard, San Francisco, CA (US); Amit Goutam Bagchi, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 1590 days.

This patent is subject to a terminal disclaimer.

(21) Appl. No.: 10/940,137

(22) Filed: Sep. 14, 2004

(65) Prior Publication Data

US 2005/0031061 A1     Feb. 10, 2005

Related U.S. Application Data

(63) Continuation of application No. 09/897,177, filed on Jul. 2, 2001, now Pat. No. 6,826,242, and a continuation-in-part of application No. 09/878,730, filed on Jun. 11, 2001, now Pat. No. 6,798,854.

(60) Provisional application No. 60/262,380, filed on Jan. 16, 2001.

(51) Int. Cl.
    *H04B 1/10* (2006.01)
(52) U.S. Cl. .................................................. 375/350
(58) Field of Classification Search ............... 375/350, 375/346, 285; 455/296, 307; 327/553, 556
    See application file for complete search history.

(56) References Cited

U.S. PATENT DOCUMENTS 5,487,129 A * 1/1996 Paiss et al. .................. 704/233
5,995,567 A * 11/1999 Cioffi et al. .................. 375/346

* cited by examiner

*Primary Examiner*—Kevin Y Kim
(74) *Attorney, Agent, or Firm*—Bruce E. Garlick; Kevin L. Smith

(57) ABSTRACT

A filter settings generation operation includes sampling colored noise present at the input of a receiver to produce a sampled signal. The sampled signal is spectrally characterized across a frequency band of interest to produce a spectral characterization of the sampled signal. This spectral characterization may not include a signal of interest. The spectral characterization is then modified to produce a modified spectral characterization. Filter settings are then generated based upon the modified spectral characterization. Finally, the input present at the receiver is filtered using the filter settings when the signal of interest is present to whiten colored noise that is present with the signal of interest. In modifying the spectral characterization, pluralities of spectral components of the spectral characterization are independently modified to produce the modified spectral characterization. Modifications to the spectral characterization may be performed in the frequency domain and/or the time domain. Particular modifications include amplifying spectral components, weighting spectral components based upon prior spectral components, and averaging spectral components with prior spectral components.

19 Claims, 13 Drawing Sheets

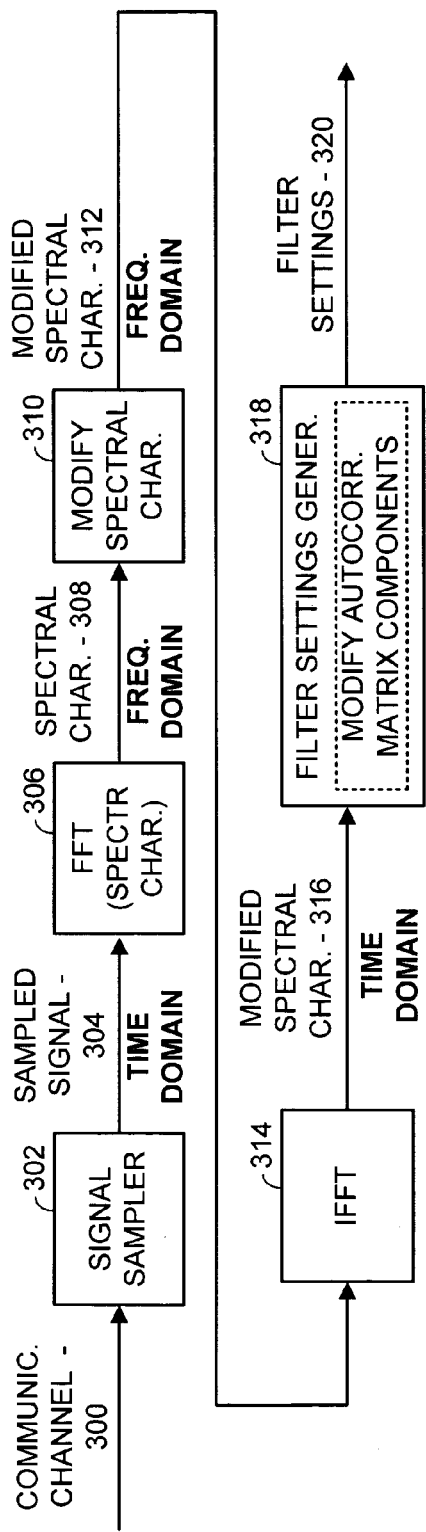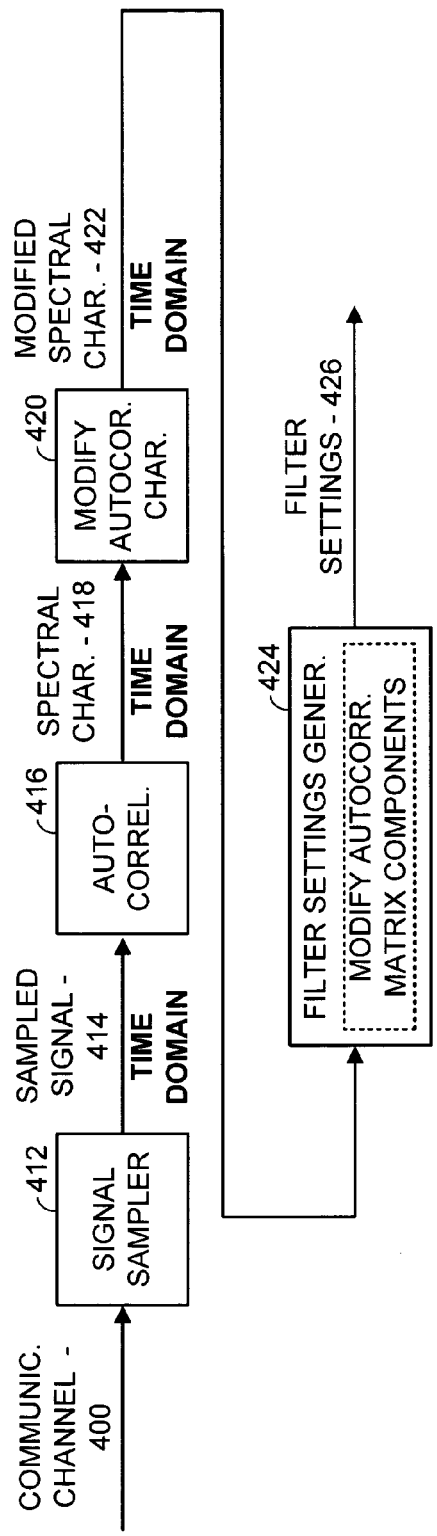

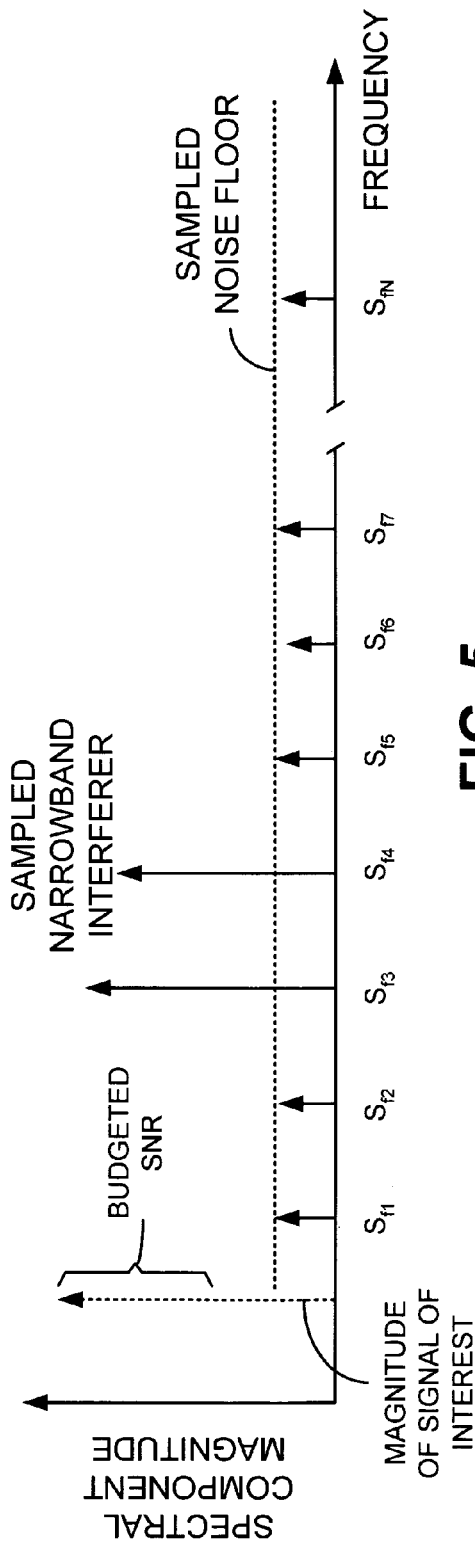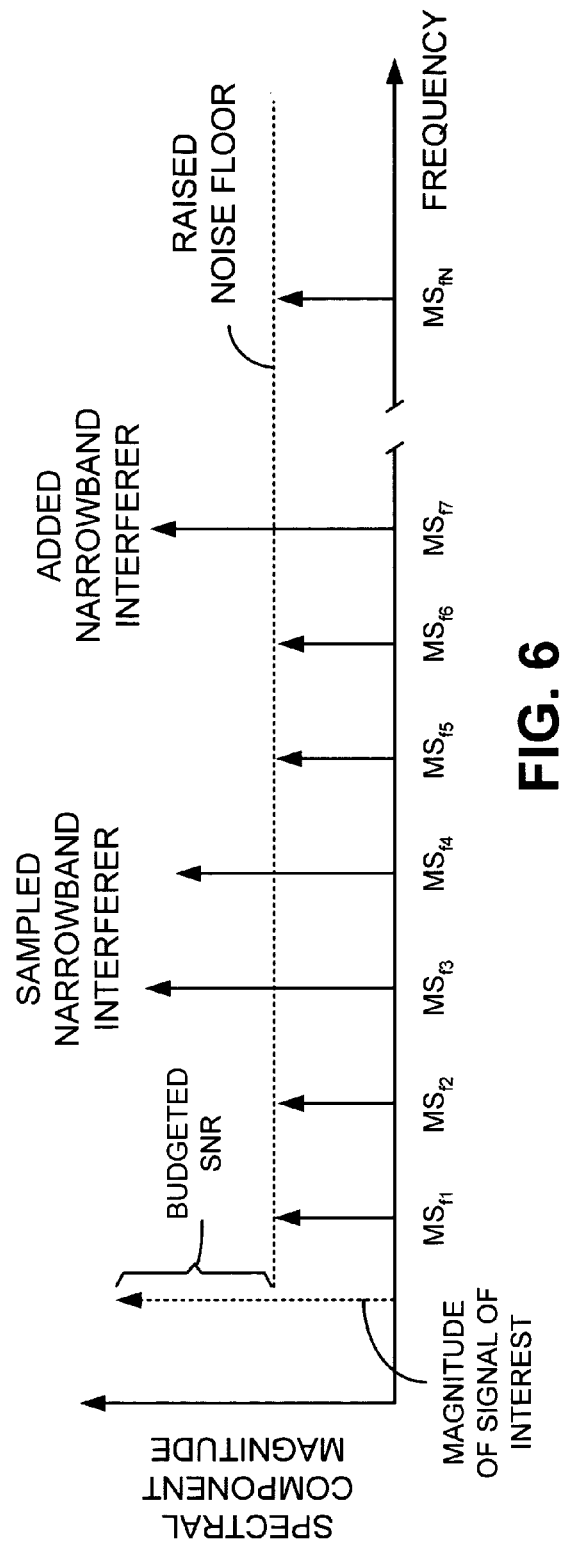

| MODE | ACTION AT THE FREQUENCY BIN |
|---|---|
| 1 | SELECT INPUT SPECTRUM AND IGNORE MASK |
| 2 | SELECT MASK AND IGNORE INPUT SPECTRUM |
| 3 | SELECT INPUT SPECTRUM OR MASK, WHICHEVER IS GREATER (MAX) |
| 4 | TAKE dB SUM OF INPUT SPECTRUM AND MASK |

METHOD FOR WHITENING COLORED NOISE IN A COMMUNICATION SYSTEM

CROSS REFERENCES TO RELATED APPLICATIONS

This application is a continuation of 09/897,177, filed Jul. 2, 2001, and now issued as U.S. Pat. No. 6,826,242, which claims priority to U.S. Provisional Application Ser. No. 60/262,380, filed Jan. 16, 2001, and which is a continuation-in-part of U.S. Regular Application Ser. No. 09/878,730, filed Jun. 11, 2001, now issued as U.S. Pat. No. 6,798,854, all of which are incorporated herein by reference in their entirety.

FIELD OF THE INVENTION

The present invention relates generally to communication systems, and more particularly to interference mitigation and noise whitening in such communication systems.

BACKGROUND OF THE INVENTION

The structure and operation of high-speed data communication systems are generally known. Such high-speed data communication systems employ various media and/or wireless links to support the transmission of high-speed data communications. Particular embodiments of high-speed communication systems include, for example, cable modem systems, home networking systems, wired local area networks, wired wide area networks, wireless local area networks, satellite networks, etc. Each of these high-speed data communication systems has some unique operational characteristics. Further, some of these high-speed data communication systems share similar operational drawbacks. Home networking systems and cable modem systems, for example, are both subject to interfering signals that are coupled on media that carry communication signals.

Cable modem systems, and more generally, cable telecommunication systems include set-top boxes and residential gateways that are in combination capable of currently providing data rates as high as 56 Mbps, and are thus suitable for high-speed file transfer, video teleconferencing and pay-per-view television. These cable telecommunication systems may simultaneously provide high-speed Internet access, digital television (such as pay-per-view) and digital telephony. Such a system is shown and described in U.S. patent application Ser. No. 09/710,238, entitled "Pre-Equalization Technique for Upstream Communication Between Cable Modem and Headend", filed on Nov. 9, 2000, the disclosure of which is expressly incorporated by reference.

Cable modems are used in a shared access environment in which subscribers compete for bandwidth that is supported by shared coaxial cables. During normal operations, sufficient bandwidth is available across the shared coaxial cables to service a large number of subscribers, with each subscriber being serviced at a high data rate. Thus, during normal operations, each subscriber is provided a data rate that is sufficient to service uninterrupted video teleconferencing, pay-per-view television, and other high bandwidth services.

Intermittent, narrowband interfering signals may, from time to time, interfere with wideband communication signals, e.g., upstream Data-Over-Cable Service Interface Specification (DOCSIS) transmissions ("desired signals"). These intermittent narrowband interfering signals unintentionally couple to the shared coaxial cables via deficiencies in shielding and/or other coupling paths. With these interfering signals present, the data rate that is supportable on the coaxial cables is reduced. In some cases, depending upon the strength and band of the interfering signals, the supportable bandwidth is reduced by a significant level.

Conventionally, when an interfering signal is present, an adaptive cancellation filter is employed by each cable modem receiver to cancel the interfering signal by adaptively placing a filtering notch or null at the frequency of the interfering signal. When the interfering signal becomes absent, the conventional adaptive cancellation filter continues to adapt and removes the filtering notch. If the interfering signal reappears, the adaptive cancellation filter again adapts to null the interfering signal. Thus, when the interfering signal first reappears, the cancellation filter cannot fully compensate for the interfering signal. Because many interfering signals are intermittent, the presence of these intermittent signals reduces the bandwidth that is supportable upon the coaxial media during the time period required for the cancellation filter to adapt. Further, because the interfering signals oftentimes vary in strength while present, the adaptive cancellation filter most often times does not fully remove the interfering signal.

Overlapping adjacent channel signals cause another source of interference for the desired signal because they often produce interfering signals in the band of the desired signal. For example, a TDMA signal that resides in an adjacent channel and that turns on and off may have side lobes that overlap and interfere with the desired signal. When the interfering signal is present, the conventional adaptive cancellation filter places a notch or null at the frequency band of the interfering signal. When the interfering signal is absent, the cancellation filter adapts to removes the notch. The precise amount of interference in the desired signal caused by the adjacent channel signals may vary with data content in the adjacent channel.

Thus, in both the case of the narrowband interferer and the adjacent channel interferer, the interfering signal(s) varies over time. For this reason, an optimal or near-optimal solution may be found only for the average interfering strength of the interfering signal(s), but not for the peak(s) of the interfering signal(s). In many operational conditions, typical fluctuations in the strength of interfering signals cause conventional cancellation filters to provide insufficient cancellation. Resultantly, overall bandwidth that could be provided by the supporting communication system on the particular shared media is significantly reduced.

Home phone line networks suffer from similar operational difficulties. Home phone line networks typically employ unshielded twisted pair (UTP) wiring for the communication of data within a premises. UTP wiring is susceptible to RFI coupling because of its construction and RFI sources, such as HAM radio transmitters, couple significant interfering signals onto the UTP wiring. Further, because Plain Old Telephone System (POTS) equipment shares the UTP wiring with the coupled data communication equipment, signals produced by the POTS equipment and introduced by the telephone network introduce additional interfering signals that affect data communications on the home phone line network.

Therefore, there is a need in the art for a filtering system and associated operations that cancel interfering signals and whitens colored noise in a communication system so that throughput is maximized.

SUMMARY OF THE INVENTION

The present invention specifically addresses and alleviates the above-mentioned deficiencies associated with the prior art to efficiently whiten colored noise present at the input of a receiver in the communication network. According to the present invention, noise present at the input of the receiver is sampled to produce a sampled signal. Then, the sampled signal is spectrally characterized across a frequency band of interest to produce a spectral characterization of the sampled signal. This spectral characterization does not include the signal of interest but does include colored noise that may include one or more interfering signals. In most embodiments, the signal of interest is a modulated carrier that carries data and that occupies a frequency band. The spectral characterization is then modified to produce a modified spectral characterization. Filter settings are then generated based upon the modified spectral characterization. Finally, the input to the receiver is filtered using the filter settings when the signal of interest is present at the input to whiten co-existent colored noise.

Various operations are employed to modify the spectral characterization to produce the modified spectral characterization. In most cases, spectral components of the spectral characterization are independently modified to produce the modified spectral characterization. Modifications to the spectral characterization are typically performed in the frequency domain but may also be partially or fully performed in the time domain. Examples of spectral component modification include amplification, weighting, and averaging of the spectral components. With tone amplification, each spectral component is amplified by a particular gain factor that is based upon the magnitude of the spectral component and a plurality of thresholds. The gain factor may also be chosen based upon a noise power characterization of the spectral characterization. The spectral components may be weighted based upon the spectral component, prior spectral components, noise power characterization of the spectral characterization, and/or prior noise power characterization(s). The spectral components may be averaged with corresponding spectral components of prior spectral characterizations in determining the modified spectral components/spectral characterization.

In one embodiment, the spectral characterization is folded from its full bandwidth into one-half of its sampled bandwidth. In such operation, pairs of spectral components are added. Filter settings are generated based upon the folded spectral characterization. Because the folded spectral characterization has one-half of the bandwidth of the spectral characterization, the filter settings must be applied to the filter to compensate for the reduced bandwidth. In one operation, the filter settings are applied to alternate taps of the filter, with remaining taps set to zero. Resultantly, the filter whitens colored noise according to the spectral characterization but the computations required to generate the filter settings are significantly reduced.

The filtering operations of the present invention may be deployed within receiver sections of home phone line network devices. When deployed in these devices, the filtering operations remove interfering signals and whiten colored noise present at the input of the receiver. Each of these operations improves the properties of the input and allows data throughput rates to be increased.

Other features and advantages of the present invention will become apparent from the following detailed description of the invention made with reference to the accompanying drawings.

BRIEF DESCRIPTION OF THE DRAWINGS

These and other features, aspects and advantages of the present invention will be more fully understood when considered with respect to the following detailed description, appended claims and accompanying drawings wherein:

FIG. 3 is a block diagram illustrating operations employed to generate filter settings corresponding to a first embodiment of FIG. 2;

FIG. 4 is a block diagram illustrating operations employed to generate filter settings corresponding to a second embodiment of FIG. 2;

FIG. 5 is a graph illustrating the spectral characteristics of a sampled signal according to the present invention;

FIG. 6 is a graph illustrating the modified spectral characteristics of a sampled signal according to the present invention;

DETAILED DESCRIPTION OF THE INVENTION

Figure 1:
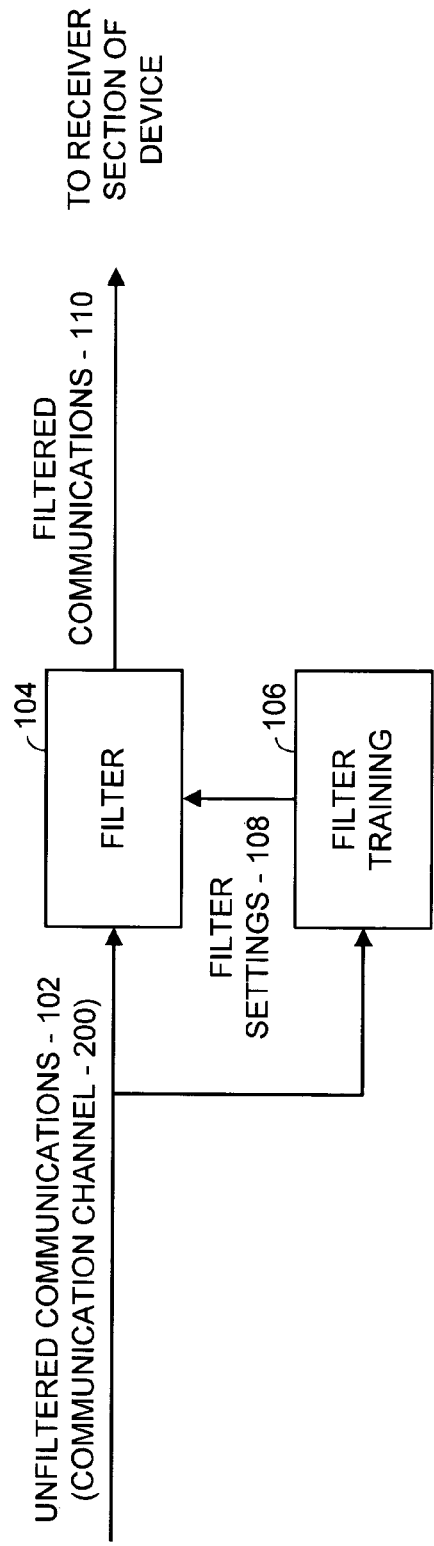
FIG. 1 is a simplified block diagram illustrating a first embodiment of a narrow band interference cancellation filter (ICF) used in accordance with the principles of the present invention.

FIG. 1 is a simplified block diagram illustrating a first embodiment of a narrow band interference cancellation filter (ICF) used in accordance with the principles of the present invention. According to the present invention, incoming unfiltered communications 102 are received on a communication channel and filtered using filter 104 to produce filtered communications 110. Filter settings 108, generated by filter training block 106, when applied to filter 104 remove narrow band interfering signals from the communication channel to produce the filtered communications 110. Thus, during normal operations, the filtered communications 110 are provided to the receiver section of a device in which the ICF resides. Because of the filtering operations of the present invention, the receiver is better able to operate on a signal of interest (desired signal) contained in the filtered communications 110 to extract data contained therein. The signal of interest, in most embodiments, is a carrier in a particular frequency band that carries digital data.

Figure 2:
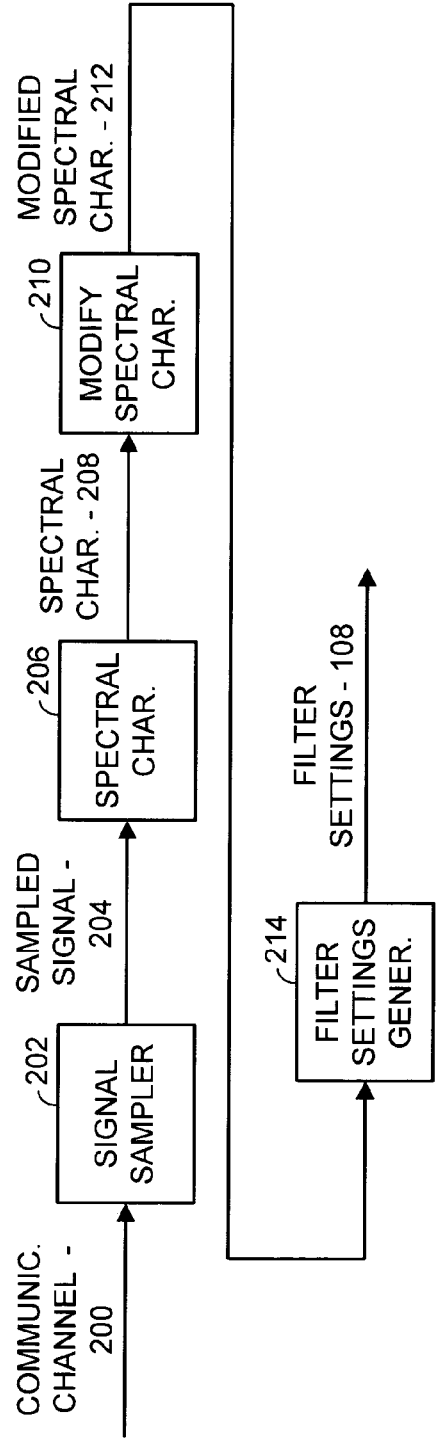
FIG. 2 is a simplified block diagram illustrating a set of operations employed to generate the filter settings of FIG. 1.

FIG. 2 is a simplified block diagram illustrating a set of operations employed to generate the filter settings 108 of FIG. 1. In operation, the filter training block 106 first samples the communication channel 200 to produce a sampled signal 204. Sampling operations are performed by the signal sampler 202 of FIG. 2. In the particular embodiment of operation illustrated, the communication channel 200 is sampled when a signal of interest (desired signal) is not present on the communication channel 200. However, in other operational embodiments, the signal of interest is present on the communication channel 200 during sampling but all or a portion of the signal of interest is removed from the sampled signal 204 by the signal sampler 202, taking advantage of a known preamble, for example.

The sampled signal 204 is then spectrally characterized across a frequency band of interest by spectral characterization block 206 to produce a spectral characterization 208 of the sampled signal 204. Because the sampled signal 204 did not include the signal of interest, the spectral characterization 208 also does not include the signal of interest. Thus, the sampled signal 204 includes noise that is present during the sampling period and includes interfering signal(s) if present. The filter training block 106 operates periodically to generate new filter settings 108. Thus, during some sample periods, interfering signals are present while during other sample periods, interfering signals are not present. Therefore, for any given operation of the filter settings generation block, the spectral characteristics 208 may or may not include interfering signals. However, the spectral characteristics 208 will always include noise at some level.

Next, the spectral characteristics 208 of the sampled signal 204 are modified to produce a modified spectral characterization 212 by modify spectral characterization block 210. The modifications performed by modify spectral characterization block 210 to produce the modified spectral characterization 212 are numerous and varied. These operations include raising the noise floor of the spectral characterization 208, introducing spectral characteristics into the spectral characterization 208 that relate to previously present interfering signals, introducing spectral characteristics of expected interfering signals into the spectral characterization 208 that are expected but that have not recently been present (or at all been present), and other preemptive modifications.

A filter settings generation block 214 then generates filter settings 108 based upon the modified spectral characterization 212. Finally, the filter settings 108 are applied to the filter 104 for subsequent filtering of the communication channel when the signal of interest is present on the communication channel.

In the description of FIG. 2, the spectral characterization 208 did not include the signal of interest. However, in other embodiments, the spectral characterization 208 may include the signal of interest and the modify spectral characterization block 210 operates upon the spectral characterization 208 to remove any spectral components corresponding to the signal of interest. Such is the case because filter settings 108 should not be generated that cancel the signal of interest. Nonetheless, in some embodiments, the filter settings 108 may include components that cancel a portion of the signal of interest without departing from the scope and spirit of the present invention.

FIG. 3 is a block diagram illustrating operations employed to generate filter settings corresponding to a first embodiment of FIG. 2. As shown in FIG. 2, the communication channel is sampled using signal sampler 302 to produce a sampled signal 304 in the time domain. The sampled signal 304 is produced by the signal sampler 302 so that a signal of interest is not present (or substantially attenuated). The sampled signal 304 is a digital representation of the analog signal that is present on the communication channel 300 during the sampling interval. However, as was previously described, in other embodiments, the signal of interest may be present in the sampled signal 304 and later operated upon so that filter settings produced do not either partially or substantially attenuate the signal of interest.

A Fast Fourier Transform (FFT) is then performed upon the sampled signal 304 by spectral characterization block 306. A Hamming or other window is used to remove sensitivity to frequency location. The FFT operation (as well as most/all other of the operations upon the digital data) is performed using a Digital Signal Processor (DSP) or another computing device resident in the device performing the operations of the present invention. The spectral characterization block 306 performing the FFT operation therefore produces a spectral characterization 308 of the sampled signal. Because no signal of interest (desired signal) was present in the sampled signal 304, no spectral components of the signal of interest (desired signal) are present in the spectral characterization 308.

As is illustrated, the spectral characterization block 306 of FIG. 3 receives input in the time domain but produces output in the frequency domain. The concepts of transformation from the time domain to the frequency domain and the transformation from the frequency domain to the time domain are well known and will be described herein only as they relate to the present invention. Modification of the spectral components of the sampled signal may be performed in the time domain and/or the frequency domain. In the embodiment of FIG. 3, modification of spectral components is first performed in the frequency domain by modify spectral characterization block 310 to produce a modified spectral characterization 312. Such modification of the spectral components by the modify spectral characterization block 310 may include raising the noise floor of the spectral characterization 308, introducing spectral characteristics that relate to previously present interfering signals, and introducing spectral characteristics of expected interfering signals, among others.

The modified spectral characterization 312 is then converted back to the time domain as modified spectral characterization 316 via Inverse Fast Fourier Transform (IFFT). In the time domain, the modified spectral characterization 316 is contained in an autocorrelation matrix, which is applied to a filter settings generation block 318 that produces the filter settings 320. Note that during the generation of the filter settings, the modified spectral characterization 316 of the sampled signal may be further modified. In the time domain, the modified spectral characterization 316 is further modified by modifying the components of the corresponding autocorrelation matrix. These further modifications may be required to generate filter settings that meet a set of filter settings criteria. Such further modification (as will be described further with reference to FIGS. 7B and 8) may include further raising the noise floor of the spectrum corresponding to the modified autocorrelation characterization 316 and using prior filter settings in order to generate a satisfactory set of filter settings.

FIG. 4 is a block diagram illustrating operations employed to generate filter settings corresponding to a second embodiment of FIG. 2. As contrasted to the operations of FIG. 3, the operations of FIG. 4 are performed fully in the time domain. As shown in FIG. 3, the communication channel is sampled using signal sampler 412 to produce a sampled signal 414 in the time domain that either does not contain the signal of interest or from which the signal of interest was substantially attenuated. This sampled signal 414 is then presented to autocorrelation block 416 that determines the autocorrelation function of the sampled signal 414. The result of this operation is the generation of a spectral characterization 418 in the time domain of the sampled signal 414 in the form of an autocorrelation matrix.

The modify autocorrelation characterization block 420 operates on the spectral characterization 418 of the sampled signal 414 in the time domain by altering the coefficients of the autocorrelation matrix. The altered autocorrelation matrix therefore represents the modified spectral characterization 422 that is in the time domain. Modification of the spectral components of the spectral characterization 418 by the modify autocorrelation characterization block 420 may include raising the noise floor of the spectral characterization 418, introducing spectral characteristics that relate to previously present interfering signals, and introducing spectral characteristics of expected interfering signals that have not yet been present, among others. The noise floor of the modified spectral characterization 418 of the sampled signal 414 may be changed by altering the diagonal components of the autocorrelation matrix. Other spectral characteristics of the spectral characterization 418 of the sampled signal 414 may be changed by altering the off-diagonal components of the autocorrelation matrix.

The modified spectral characterization 422 is applied to a filter settings generation block 424 that produces the filter settings 426. Note that during the generation of the filter settings, the modified spectral characterization 422 of the sampled signal may be further modified. Such further modification may be required to generate filter settings that meet a set of filter settings criteria. Such further modification (as will be described further with reference to FIGS. 7B and 8) may include further raising the noise floor of the modified spectral characterization 422 and using prior filter settings in order to generate a satisfactory set of filter settings. Spectral characteristics of the modified spectral characterization 422 are further altered in the filter settings generation block 424 by modifying the components of the corresponding autocorrelation matrix.

FIG. 5 is a graph illustrating the spectral characteristics of a sampled signal according to the present invention. The representation of the sampled signal of FIG. 5 is in the frequency domain, e.g., spectral characterization 308 of FIG. 3. In one embodiment of the present invention, the spectral characterization will include 256 unique "frequency bins" within a frequency band of interest. Each frequency bin corresponds to a unique frequency, includes a magnitude component and may include an angular component. In a particular implementation of the present invention, the represented magnitude represents the power of the sampled signal, e.g., signal magnitude squared, without an angular component. Further, in the particular embodiment, the represented magnitude is expressed in a logarithmic scale, e.g., log base 2, for each frequency bin.

Thus, in the graph of FIG. 5, the frequency bins include components for 1, 2, . . . , N, where N=256. The spectral characterization of the sampled signal includes a spectral component for each frequency bin, denoted as $S_{f1}$, $S_{f2}$, . . . , $S_{fN}$. Because no signal of interest (desired signal) is present in the spectral characterization of FIG. 5, each spectral component corresponds to either noise or a combination of noise and a sampled narrowband interferer. For example, spectral components $S_{f3}$ and $S_{f4}$ correspond to a particular narrowband interferer that was present on the communication channel during the sampling interval. Other spectral components corresponding to interfering signals that are present during the sampling interval may also be present but are not shown in the example of FIG. 5.

Also illustrated in FIG. 5 is a representation of a noise floor for the spectral characterization. The level of the noise floor may be calculated as an average of spectral components that do not exceed a threshold, an average of all spectral components, a weighted average of all or a portion of the spectral components, or in another manner that accurately represents the noise floor for the sampled signal.

Also illustrated in FIG. 5 is the concept of a budgeted signal to noise ratio (SNR) for the communication channel. As is generally known, in the design of a receiver, a minimum SNR is desired for satisfactory demodulation operations to be performed. This minimum SNR is referred to herein as the budgeted SNR. Based upon this budgeted SNR and an estimate of the signal strength of the signal of interest (desired signal) that will be received by the receiver, an estimated level of an acceptable noise floor is determined. As is illustrated in FIG. 5, the sampled noise floor lies below the difference between the magnitude of the signal of interest (desired signal) and the budgeted SNR. Thus, in the example of FIG. 5, the receiver could operate within its design criteria even if the noise floor of the communication was higher than the sampled noise floor.

FIG. 6 is a graph illustrating the modified spectral characteristics of a sampled signal according to the present invention. As compared to the spectral characterization of FIG. 5, the modified spectral characterization includes a raised noise floor and an added narrowband interferer at frequency bin f7. In raising the noise floor, the magnitude of some, most, or all of the spectral components is raised until the raised noise floor corresponds to the difference between the expected magnitude of the signal of interest (desired signal) and the budgeted SNR. In adding a spectral component of the added narrowband interferer, the magnitude of one or more spectral components corresponding to the added narrowband interferer is increased to a desired magnitude. The modified spectral components are then used to generate the filter settings.

The spectral component modifications illustrated with reference to FIGS. 5 and 6 are performed in the frequency domain. However, similar operations may also be performed in the time domain by operating upon the autocorrelation matrix, as was previously discussed. Further, according to one particular embodiment of the present invention (that will be discussed with reference to FIGS. 7A, 7B, and 8) the spectral characterization is first modified in the frequency domain and then, depending upon whether such modification is required to meet filter design criteria, additional spectral modifications are made in the time domain.

The description of FIGS. 7A through 13 relate to the manner in which the present invention may be applied to a cable modem application. Further, the description of FIGS. 14 through 18B relate to the manner in which the present invention may be applied to a home networking application. The principles described with respect to each of these embodiments could easily be applied to other networking embodiments, e.g., the concepts described in FIGS. 7A through 13 could be applied to a home networking application and the concepts described in FIGS. 14 through 18B could be applied to a cable modem application. Further, all of these concepts and teachings could be applied to any networking application in which noise whitening and ingress cancellation is desirable.

Terminology and character selection employed in FIGS. 7A through 13 may be partially inconsistent with terminology and character selection employed in FIGS. 14 through 18B. Thus, the reader should not necessarily conclude that the characters and terminology of FIGS. 7A through 13 are consistent with the terminology of FIGS. 14 through 18B, even though they are in a number of instances. Further, while the some of the terminology of FIGS. 5 and 6 relates solely to the discussion of FIGS. 7A through 13, most of the terminology also relates to the discussion of FIGS. 14 through 18B as well.

Figure 7A:
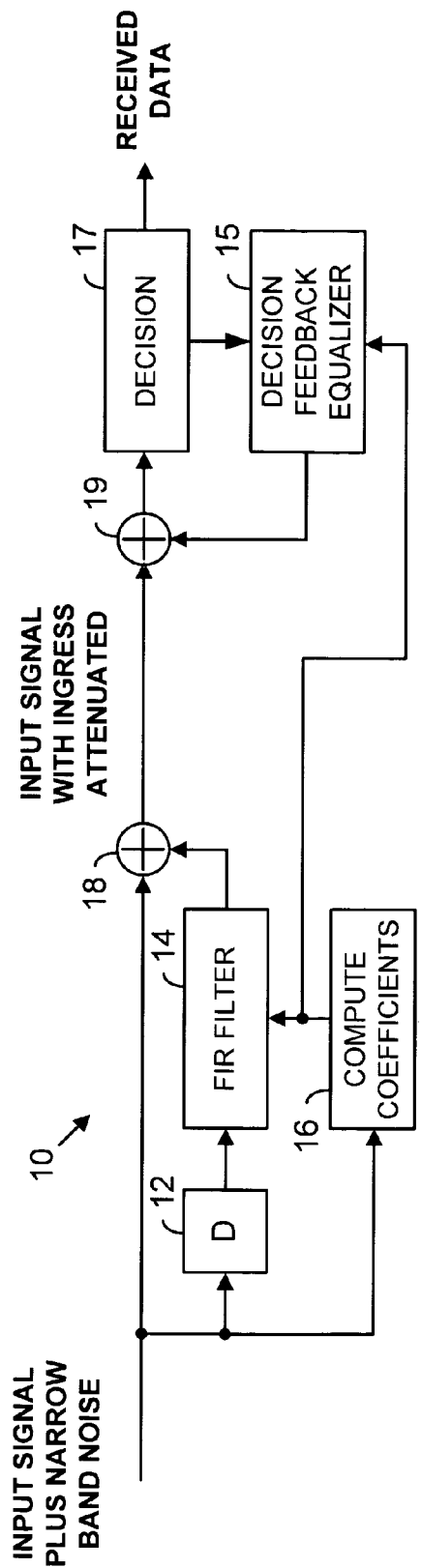
FIG. 7A is a simplified block diagram illustrating an embodiment of a narrow band interference cancellation filter used in accordance with the principles of the present invention.

FIG. 7A is a simplified block diagram illustrating an embodiment of a narrow band interference cancellation filter used in accordance with the principles of the present invention. In FIG. 7A, a narrow band interference cancellation filter (ICF) 10 is operative to null out narrowband interference such as ingress and/or adjacent channel interference from an input signal. In the embodiment, ICF filter 10 generates a set of adaptive, predictive filter tap weights, based on a weight computation algorithm. In the embodiment, the ICF tap weights are computed during idle slots when interference is present, but no desired signal is present.

ICF filter 10 includes a delay element 12 to provide a unit delay of one sample, an adjustable finite impulse response (FIR) filter 14, and a tap weight computation circuit 16. An input signal having narrow band interference such as ingress or adjacent channel interference is received by ICF filter 10. The input signal is introduced to delay element 12, tap weight computation circuit 16, and a summing junction 18. Circuit 16 computes tap weights, which adjust the pass band characteristics of FIR filter 14 to null out, i.e., cancel, narrow band interference appearing in the input signal. For example, if a noise spike or an intermittent carrier from another channel appears in the signal, FIR filter 14 would be adjusted to have a notch at the frequency of the interference appearing in the input signal. The output of delay element 12 is coupled to FIR filter 14. FIR filter 14 filters the input signal based on the tap weights. In a typical embodiment of the invention, FIR filter 14 might have 16 taps. The output of FIR filter 14 is combined with the input signal in summing junction 18. The output of summing junction 18 is thus equal to the input signal with the interference attenuated (or nulled).

The signal distortion caused by the ICF 10 may be compensated by a decision feedback equalizer (DFE) 15 in combination with a summing node 19. The filter taps generated by the compute coefficients block 16 are also provided to the DFE 15. The DFE 15 receives the filter taps and, based upon the filter taps, generates a compensation output that is summed with the input signal with ingress attenuated at summing node 19. The output of the summing node 19 is then received by a decision block 17, which also receives input from the DFE 15. The decision block 17, based upon the input from the summing node 19 and the DFE 15, produces received data.

Figure 7B:
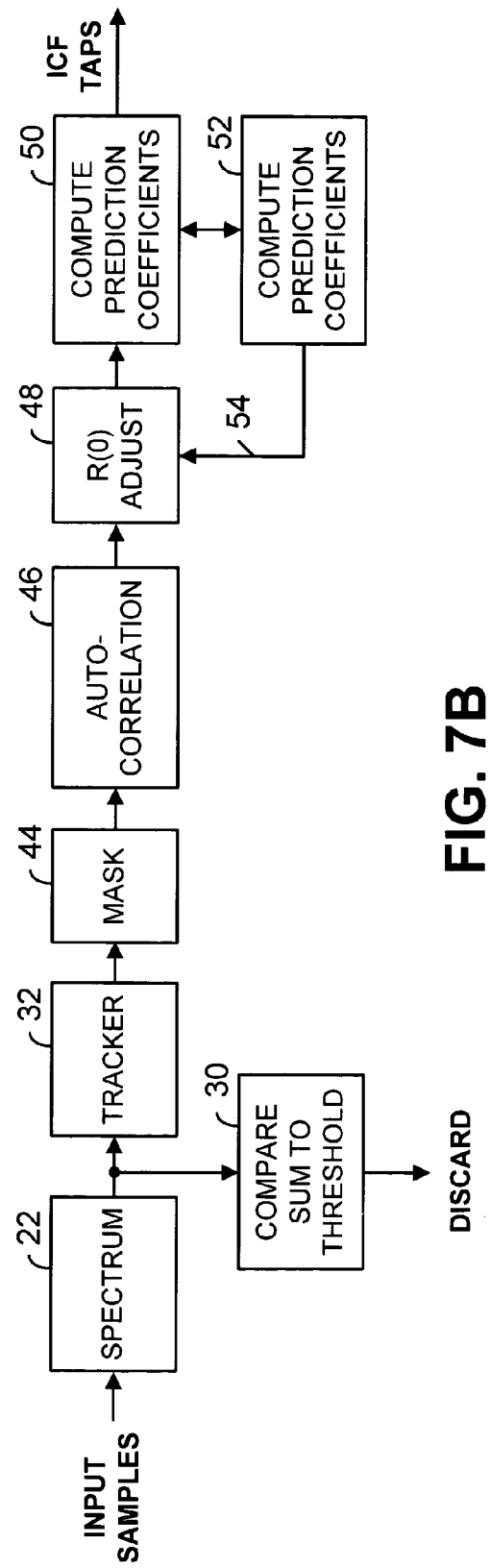
FIG. 7B is a block diagram of a filter weight computation algorithm for the ICF of FIG. 7A.

In FIG. 7B, the functional elements of the algorithm represented as tap weight computation circuit 16 of FIG. 7A are shown in more detail. The input signal from FIG. 7A, which includes narrow band interference such as ingress and adjacent channel disturbances, is processed as shown in FIG. 7B. First, the narrow band interference is separated from the signal. In the embodiment, a block of 256 complex samples is taken from the communication channel during idle Time Division Multiple Access (TDMA) slots, thereby representing the narrowband interference. For example, as illustrated in co-pending application Ser. No. 09/710,238, filed on Nov. 9, 2000, the MAC at a cable modem termination system could create idle slots that insure there are time intervals in which no cable modems are transmitting an upstream signal. The samples are taken during these idle slots. In another embodiment, the interference is separated from the signal by estimating the signal (or a known portion thereof, such as a preamble) and subtracting the estimated signal from the input signal, leaving only the narrow band interference. In yet another embodiment, periods of no signal on the communication channel are sensed by a threshold detector or SNR detector, and the samples are only taken during such periods. In any case, time intervals containing narrow band interference without signal are produced for sampling and processing by circuit 16.

Preferably, the input samples are converted to the frequency domain using a fast Fourier transform (FFT) block 22, which takes a complex fast Fourier transform of the input samples. Working in the frequency domain facilitates a number of the operations described below such as verifying the narrow band content, tracking the changes in the interference with different time constants, and frequency masking. However, the tap values could be computed in the time domain using autocorrelation properties in another embodiment (as described in FIG. 4). In the embodiment of FIG. 7B, a 256-point windowed FFT of the input samples is taken to produce a representation of the sampled spectrum without signal, i.e. the spectrum of the narrow band noise only. Typically, as many as 100 such blocks of samples are captured during a time interval T (typically, T=1 second), so as to permit rapid tracking of time varying narrow band interference.

The sampled spectrum without signal comprises 256 frequency bins each having complex values that represent the energy in the frequency band of the bin. These frequency bins were illustrated generally with reference to FIGS. 5 and 6. Preferably, the complex values of each bin are converted to the absolute value of the result that is transformed to the logarithm of the absolute value, thus providing an estimate of the log power spectral density (PSD) of the interference.

To verify the narrow band content of the sampled energy, the output of block 22 is summed over all the frequency bins comprising the log spectrum, and this sum is compared to a threshold value, as represented by a block 30. If the sum exceeds the threshold value, then that spectrum is discarded, and no further processing is performed during that particular time slot. The spectrum is discarded if the threshold is exceeded because that indicates that a large amount of the energy of the spectrum comprises strong wide band energy, or other content that is inconsistent with narrowband interference. If such a spectrum were included in the computations made to generate the tap weights, instead of being discarded, it could result in corrupting the narrow band interference spectrum estimate, and therefore the tap weights.

Figures 9, 10:
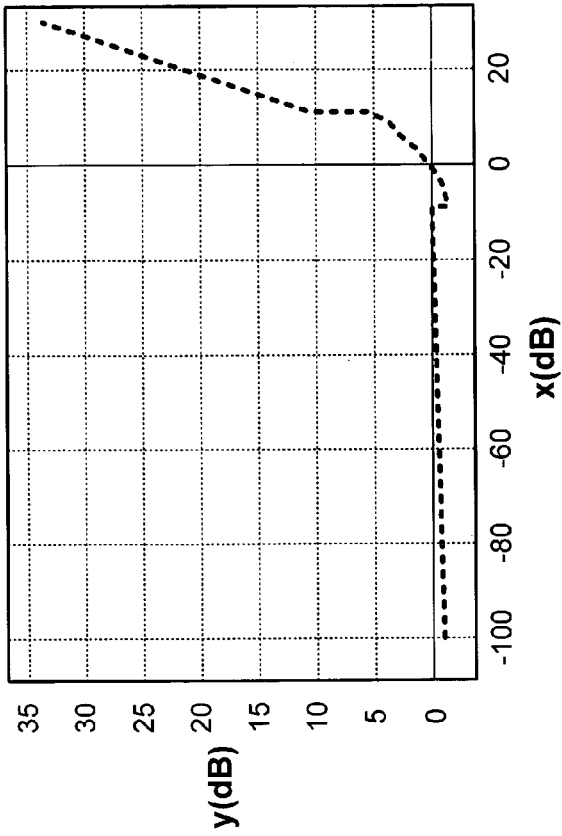
FIG. 9 is a table of modes used in connection with a spectral mask incorporated in the algorithm of FIG. 7B.
FIG. 10 is a diagram illustrating a non-linear function used in connection with the tracker of the filter weight computation algorithm of FIG. 7B.

If the sum passes the threshold test, the spectrum is then introduced to a maximum-hold tracking filter represented by a block 32, which tracks the changes in the interference with different time constants. This tracking filter maintains an upper bound (with leak) on each frequency bin, over multiple input spectra, i.e., multiple blocks of input samples. Preferably, the tracking filter implements a fast-attack, slow-decay function, or a leaky maximum-hold function, depending on the parameters of the error gain function f(x) applied by filter 32. As illustrated in FIG. 10, the error gain function f(x) is preferably a nonlinear function with a high gain for large positive errors, thereby causing it to rapidly increase when a new narrow band interference source appears, and a very low gain for large negative errors, so that the spectrum estimate remembers an interfering signal for a period of time after the narrow band interference disappears. Therefore, in the case of intermittent narrow band interference at a given frequency, the filter does not require significant retraining every time the narrow band interference reappears. In summary, the tracking filter produces an average of the input spectra taken over different periods of time, depending upon the error gain function.

Preferably, different gain characteristics similar to those shown in FIG. 10 are applied to the frequency bins individually or in groups. For example, eight different characteristics could be used and three control bits could be assigned to each bin in order to select the gain characteristic for that bin. Depending upon the particular interference pattern of the communication channel, the control bits are selected to combat the interference. The output of the tracking filter block 32 is then applied to a frequency mask represented by a block 44, where a user-defined spectrum mask may be applied to cancel selected frequency bins of the filtered spectrum leaving the tracking filter.

Each of the frequency bins of the mask has associated with it two mode bits, designating how the mask and the spectrum are to be combined. (See FIG. 9.) The user-defined mask may indicate the presence of overlapping, adjacent-channel energy, or a known, narrowband interferer, or the like. The spectrum of the permanent energy spectrum of the channel can be monitored either by a human observer or automatically by spectrum analysis and intelligent computer algorithms, to identify for example adjacent overlapping channel energy or known interference sources; the mask cancels these unwanted energy components in a flexible way based on the selected mode. The user may select from a number of different modes of combining the inputs to block 44 on a bin by bin basis. For example, the input spectrum could be used en toto and the mask disregarded; the mask could be used en toto and the input spectrum disregarded; the larger of the input spectrum or the mask could be used or the sum of the input spectrum and the mask in dB could be used. Each combining method is selected independently from bin to bin.

The noise floor of the spectrum is also adjusted according to the present invention in mask block 44. Such noise floor alteration was described with reference to FIGS. 5 and 6 and, while performed by block 44 of FIG. 7B, may be performed within or adjacent to tracker block 32. The concept of an SNR goal is used to determine how high the noise floor should be in a robust design. For example, for a communications system that uses uncoded 16-QAM modulation, a goal of 20 dB is required for good bit error rate (BER) performance. If the thermal noise floor is very low, for example if 30 dB energy per symbol to noise density ratio (Es/No) is available, then it is not necessary to null out the narrow band interference all the way down to the white noise floor. For example, a 0 dBc interferer only needs to be nulled by a little over 20 dB, not by 30 dB. In this example, one would raise the noise floor by approximately 10 dB.

The noise floor of the spectrum is raised to the SNR goal for the following reasons:

It tends to make the numerical computations of the filter coefficients more robust.

It helps whiten the noise floor, de-emphasizing small peaks that may have been caused by the tracking filter.

It tends to reduce the size of the ICF tap weights, which is desirable from the standpoints of demodulator tracking and DFE error propagation.

In adjusting the noise floor via mask block 44 operations, the spectrum is processed to find those frequency bins that correspond to interference peaks, and those that comprise a noise floor. One way to perform this processing is by simple comparison with a threshold. Another way (preferred) is by sorting the spectrum into peaks and floor on a bin by bin basis. The floor bins are averaged in dB and adjusted to produce the desired SNR goal. The spectrum intensity in these noise floor bins (those below the threshold) is then further adjusted to the point where the budgeted SNR goal of the communication system is just met. It is assumed in this discussion that the spectrum being processed contains higher SNR than the SNR goal; if not, insufficient margin exists and the noise floor may not be beneficially raised.

After application of the mask and raising of the noise floor, the spectrum is converted to its anti-log and the inverse FFT function is performed on the output of block 44 to return to the time domain as represented by an autocorrelation block 46. If $\underline{n}$ is the number of taps in FIR filter 14, the first $\underline{n}$ time bins of the IFFT at the output of block 46 are used to produce the coefficients of the taps of filter 14. After computation of the tap weights and comparison with constraints, it is determined if further modifications to the noise floor should be made; this is addressed in FIGS. 8, 11, and 12. If further changes in the noise floor are needed, then, as represented by R(0) adjust block 48, these changes may be accomplished via adjustment of the R(0) term of the autocorrelation function, which is output by block 46.

The noise floor from block 48 and the first $\underline{n}-1$ time bins of the IFFT are supplied to a prediction algorithm for computing prediction coefficients as represented by a block 52. The prediction coefficients are based on past spectrum values. The prediction algorithm could be a standard algorithm for predicting a stationary time series from the finite past (such as the Trench algorithm discussed herein below). The filter coefficients computed by the prediction algorithm of block 52 are tested against three tap constraints represented by a block 50. If the constraints are not satisfied, an adjustment is made to R(0) by block 48 until the prediction coefficients do fall within the constraints. It may also be necessary to recompute the prediction coefficients with a constraint imposed. The prediction coefficients are inverted in polarity and used as the ICF tap weights for FIR filter 14 (FIG. 1B).

The R(0) adjust of block 48 can be used to establish an artificial noise floor for the algorithm. In such case, the R(0) adjust in essence simulates noise that either augments or reduces the actual noise on the communication channel and the algorithm responds accordingly to calculate ICF tap coefficients that have a built in positive or negative margin.

Figure 11:
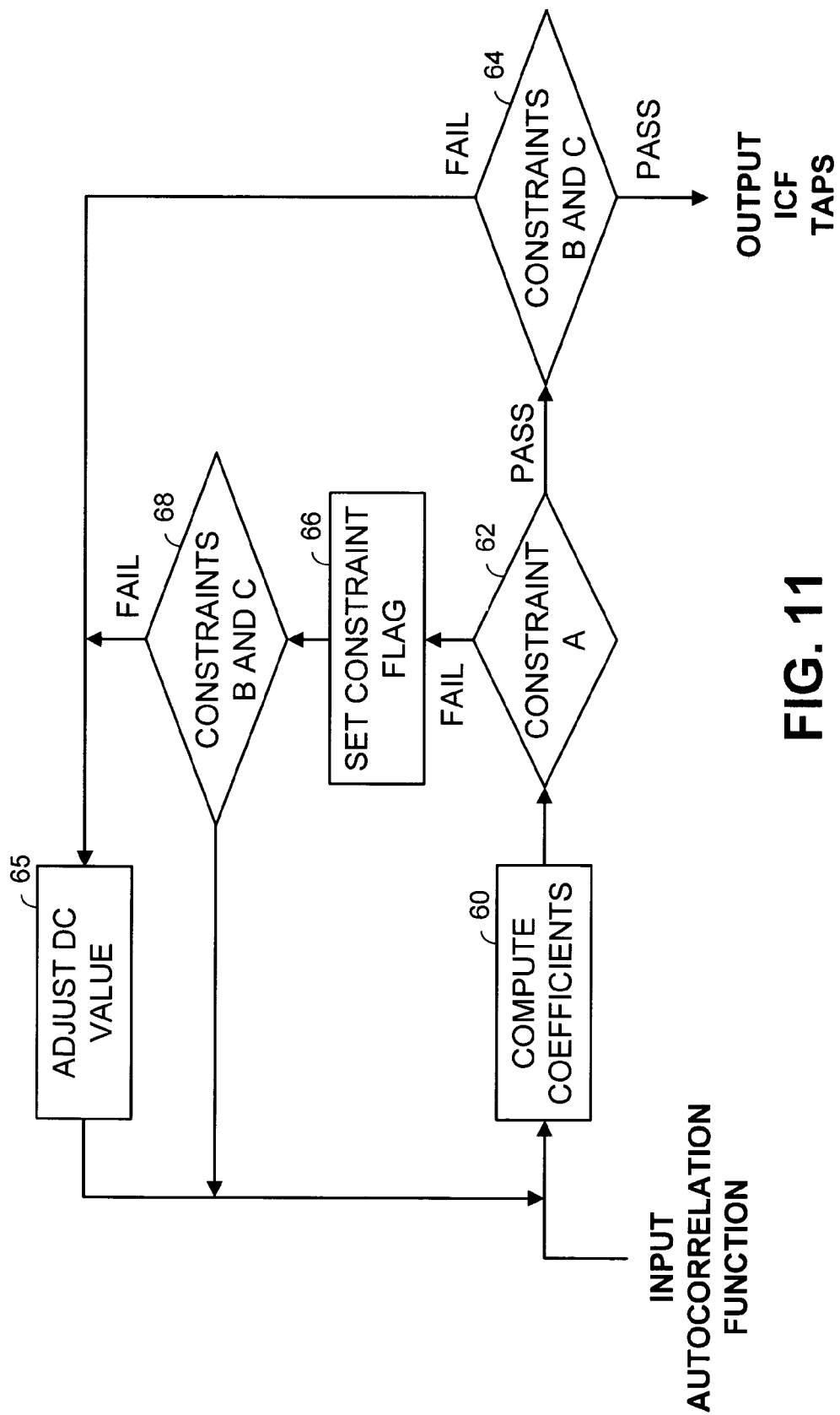
FIG. 11 is a flow diagram depicting a noise floor setting algorithm for the filter weight computation algorithm of FIG. 7B.

An algorithm shown in FIG. 11 carries out the constraints represented by block 52. The autocorrelation function produced by autocorrelation block 46 is processed by a step represented by a block 60 using the predictive algorithm of block 50 to compute an initial set of ICF tap weights to be tested by the constraints. The ICF tap weights resulting from block 60 are compared with a constraint A at query block 62. In one embodiment, constraint A is that the lowest order tap magnitude be smaller than 0.25.

If constraint A is satisfied, i.e., passes, then the operation proceeds to a query block 64, where the process determines whether constraints B and C are satisfied. In one embodiment, constraint B is that the sum of the tap magnitudes is smaller than 3, and constraint C is that the absolute values of the real and imaginary parts of all prediction taps (I and Q) is less than 2.

If both constraints B and C are also satisfied, then the ICF taps are output and the algorithm is finished. If one or both are not satisfied, i.e., fail, however, then operation proceeds to a step 65, and the R(0) value of the autocorrelation function is adjusted. This adjustment changes the input autocorrelation function. Operation then proceeds back to the step represented by block 60 to recompute the prediction coefficients and repeat the described steps.

However, if at query block 62 constraint A is not satisfied, then the operation proceeds to a step 66 and a constraint flag is then set, which from then on results in the invocation of a constrained algorithm, which incorporates the magnitude of the first tap as a constraint on the solution. Operation then proceeds to a query block 68, where the process determines whether constraints B and C are satisfied. If so, then the operation proceeds back to the step represented by block 60 to recalculate the prediction coefficients using the constraint.

If at query block 68 one or both of constraints B and C are not satisfied, then operation proceeds to a step 65, the R(0) value is adjusted, and operation then proceeds back to step 60.

In one embodiment of the invention, an iteration limit is enforced on the number of times the prediction coefficients are computed pursuant to block 60. For example, the prediction coefficients may be computed up to five times in an effort to satisfy the three constraints. If after the selected number of iterations, the constraints are still not satisfied, then the previous ICF tap weights are allowed to persist.

Figure 12:
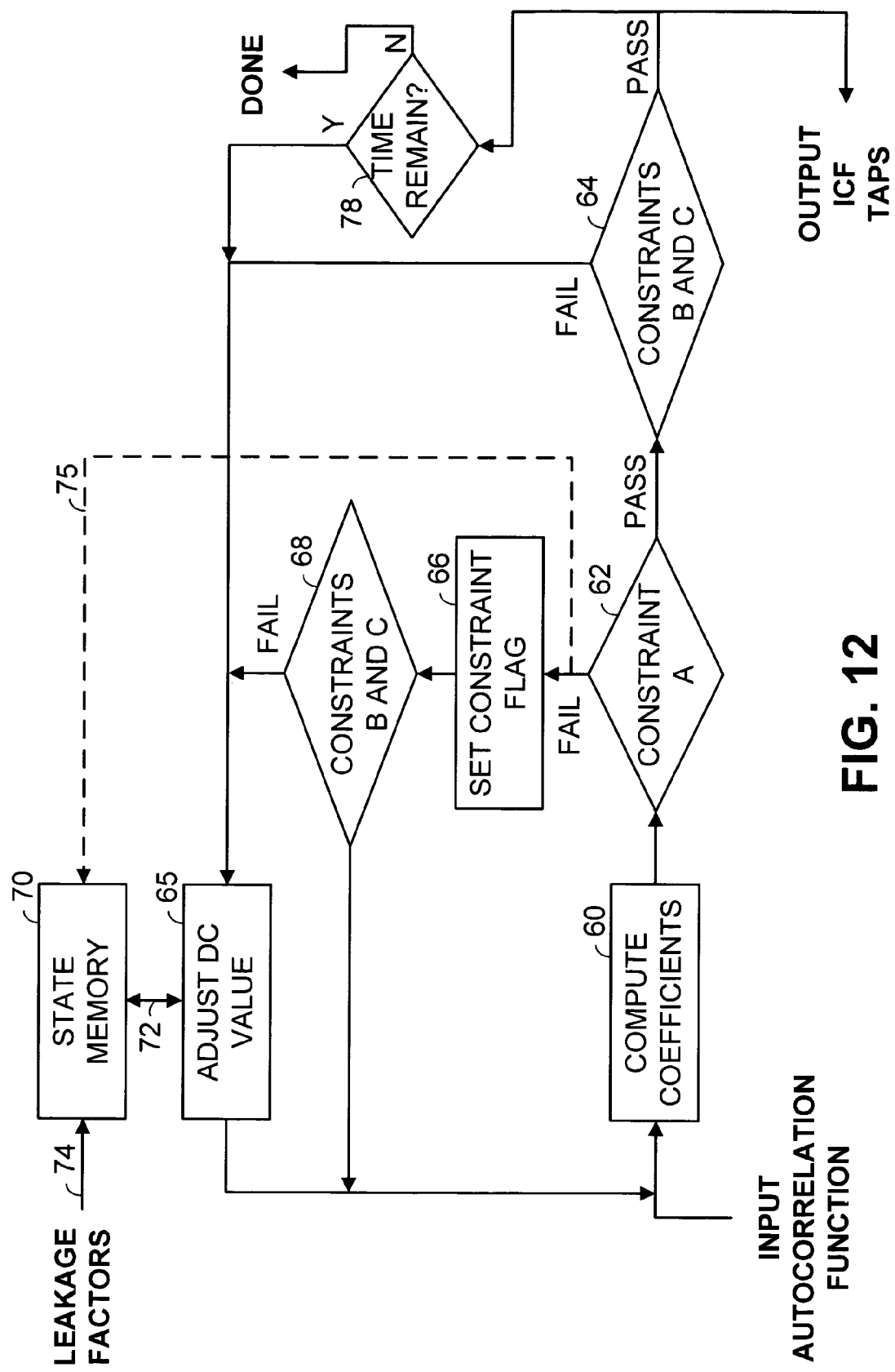
FIG. 12 is a flow diagram depicting a modified noise floor setting algorithm for the filter weight computation algorithm of FIG. 7B.

In a further improvement, rather than beginning the design iteration cycle of FIG. 11 afresh with each updated spectrum estimate, a means of incorporating information from previous designs is employed to shorten time required to calculate the prediction coefficients. This is shown in FIG. 12, in which the results of the initial tap weight computation, together with the results of the initial computation and last computation of the previous design, are used to determine the parameters for the second computation of the current design. The previous design refers to the final ICF taps output from block 64 after the last calculation and the current design refers to the ICF taps being derived in the course of the present calculation.

In FIG. 12, the elements used in the algorithm of FIG. 11 are assigned the same reference numerals. In one embodiment, a state memory 70 stores the following state variables from the previous design (filter setting generation operation):
  Whether constraint A failed on $1^{st}$ iteration of previous design.
  Whether constraint A failed on any iteration of previous design.
  First R(0) adjustment of previous design.
  Cumulative R(0) adjustment predicted by previous design for use in current design.

These state variables, or other selected suitable variables used in the algorithm, are taken into account in computing the R(0) adjustment of the current design, as represented by a double ended arrow 72 between blocks 70 and 65. In addition, a leakage factor is included in the memory characteristics of state memory 70, as represented by an arrow 74. The leakage factor determines the weighting given to the past values of the variable relative to the present values of the variables. If the leakage factor is zero, the past has no influence, i.e., it is ignored. If the leakage factor is unity, the influence from the past is fully weighted. Normally a value slightly less than unity is used for the leakage factor. As represented by a broken line arrow 76 and arrow 72 to state memory 70, the state variables are transmitted to state memory 70.

In a further improvement of the algorithm of FIG. 11, as represented in FIG. 12, by a query block 78, the iterations continue as time permits, further refining the noise floor/R(0) value. The R(0) value may be further increased or reduced. For example, there may be time for three iterations of the algorithm of FIG. 11 before the arrival of a new spectrum estimate. The algorithm may initially adjust the noise floor on the first iteration by a large amount for maximum convergence speed. The second iteration will then meet the constraints with excess margin. This will lead to a lowering of the noise floor on the third iteration, which as a result may or may not satisfy the constraints. The next design can then benefit from the previous design. In this fashion, a design satisfying a new interference spectrum can be found and applied quickly. The most recent design that passed the constraints is the one to use in the ICF. Iterations that are more recent, but did not pass the constraints, or did not complete due to lack of time, are not used. However, the most recent iteration, regardless of whether it passed the constraints, is stored in the state memory for use by the next design.

First, an initial unconstrained computation is performed in the manner described in FIG. 11. The results of this initial tap weight computation, together with the results of the initial computation and last computation of the previous design, are used to determine the parameters for the second computation of the current design. For example, in one embodiment there may be time for three iterations of FIG. 11 before the arrival of a new spectrum estimate. The algorithm may initially adjust the noise floor on the first iteration by a large amount for maximum convergence speed. The second iteration will then meet the constraints with excess margin. This will lead to a lowering of the noise floor on the third iteration, which as a result may or may not satisfy the constraints. The next design can then benefit from the previous design. In this fashion, a design satisfying a new interference spectrum can be found and applied quickly.

The unconstrained algorithm employed to compute the filter settings is described in a paper: William F. Trench, "Weighting Coefficients for the Prediction of Stationary Time Series From the Finite Past," SIAM Journal of Applied Math, Vol. 15, No. 6, November 1967, pp 1502-1510 (Hereinafter "Trench", "Trench paper" and/or "Trench operations").

In using the Trench operations, it is necessary to begin with the autocorrelation function of the process which is to be predicted (i.e., predicted and then canceled in our application) when designing prediction taps using the Trench operation equations. We develop an estimate of the desired autocorrelation function in our ICF processing by inverse Fourier transforming the power spectrum of the ingress (tracked, masked, and otherwise processed to be made most suitable for noise canceling). When N taps are to be used in the prediction (or canceling) filter, plus the initial or feed-through tap, then the autocorrelation function is needed for displacements of zero to N, i.e., R(n), n=0 to N. In the traditional case of designing prediction taps using the equations from Trench, the recursion formulae presented in Trench's Theorem 1 suffice, and the N+1 values of the autocorrelation function are all that is necessary as input to the recursions.

In the case of the constrained first tap magnitude operations, however, the traditional design procedure is not sufficient. If one design of the prediction taps is completed in the traditional way, and it is found that the first tap magnitude is larger than desired (constraint A), for whatever reason, then a remedy for this situation is as follows. Assume that the first tap in the prediction filter just derived is given as $p_1$, and that it is desired to limit its magnitude to p1_limit. We then desire to find the best values for the remaining prediction taps, $p_2$ to $p_N$, given that the first tap now must be constrained.

We call upon Theorem 2 in Trench to solve this more difficult problem than the original, unconstrained design. As in the traditional unconstrained design, we use our autocorrelation function, $R(n)$, $n=0$ to N, as the input to the recursions of the reference. Our autocorrelation function $R(n)$ is used to define the autocorrelation matrix $\Phi_{r-s}$, for $r,s=0$ to N−1, of Reference 1, in the traditional unconstrained design.

To accommodate the constrained design, we make the following modifications:

1. In Equation 9 of the Trench paper, we now define the matrix $\Phi_{r-s}$, for $r,s=0$ to N−2, using $R(n)$, $n=0$ to N−2. Further, in Equation 9 of Reference 1, we define $\eta_r$, for $r=0$ to N−2, as $\eta_k = R(k+2) - [R(k+1)p_1/|p_1|][p1\_\text{limit}]$, $k=0$ to N−2.

2. Then, the recursions of the Trench paper, Theorem 2, are carried out.

3. After completing the recursions of the Trench paper, the solution to Equation 9 is developed, and is denoted in the reference as $\xi_{0m}, \xi_{1m}, \ldots, \xi_{mm}$, where we have m=N−2 in our constrained case here.

4. The prediction tap coefficients for this constrained tap design case are then $p_{1,\text{constrained}} = [p_1/|p_1|][p1\_\text{limit}]$;

$p_{n,\text{constrained}} = \xi_{n-2,N-2}$, for n=2 to N.

5. The N values $p_{n,\text{constrained}}$, n=1 to N, constitute the N coefficients for the desired prediction filter. Note that since noise canceling is our desire, the additive inverse of these coefficients is used in the ingress canceling filter. These operations conclude one embodiment of the constrained algorithm.

Figure 8:
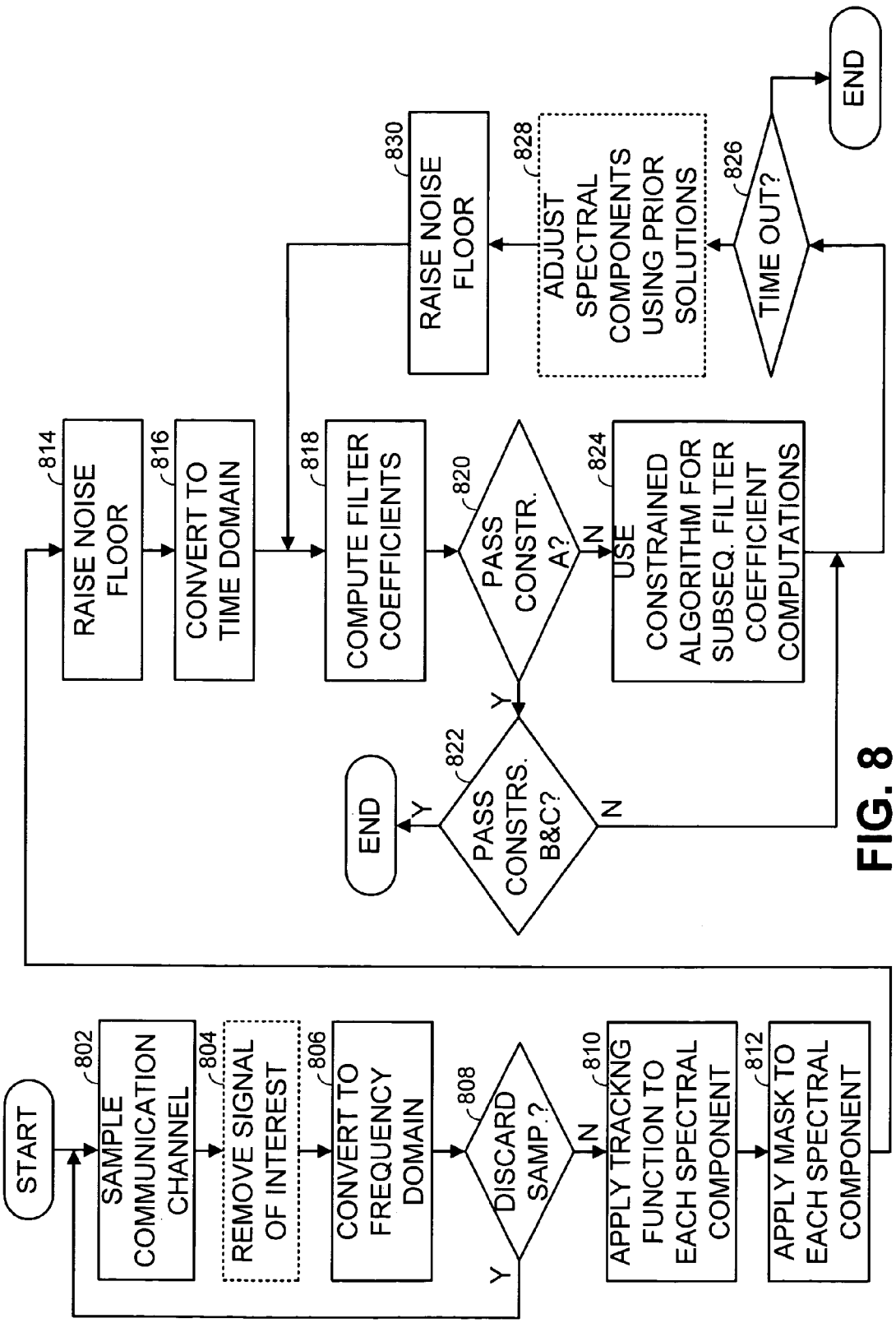
FIG. 8 is a logic diagram illustrating operations performed corresponding to the filter weight computation algorithm of FIG. 7B.

FIG. 8 is a logic diagram illustrating operations performed corresponding to the filter weight computation algorithm of FIG. 7B in a different manner. The operations of FIG. 8 are performed for each sampling interval. Operation commences by sampling the communication channel to produce the sampled signal (step 802). If the communication channel is sampled while a signal of interest (desired signal) is present, the signal of interest is removed from the sampled signal (step 804). The sampled signal is then converted to the frequency domain to produce a spectral characterization of the sampled signal (step 806). An example of such a spectral characterization is illustrated in FIG. 5.

The spectral characterization of the sampled signal is then compared to a threshold to determine whether the sampled signal is valid (step 808). One particular technique for performing this determination was described with reference to block 30 of FIG. 7B. If the spectral characterization is discarded, the operation of FIG. 8 for the particular sampled signal is complete and operation returns to step 802 wherein the communication channel is sampled during the next sampling interval.

If the spectral characterization is valid, one or more tracking functions are applied to each spectral component of the spectral characterization (step 810). Then, the user mask is applied to each spectral component (step 812). These operations were described in detail with reference to FIG. 7B. Next, the noise floor of the spectral characterization is raised to a budgeted SNR (step 814). This operation was described with particular reference to FIGS. 5, 6, and 7B. All of these operations of step 810, 812, and 814 are performed in the frequency domain. The result of these operations is the production of a modified spectral characterization. The modified spectral characterization is then converted to the time domain (step 816).

With the modified spectral characterization in the frequency domain, a first set of filter coefficients for the sample interval is computed (step 818). This operation may be performed according to the Trench paper. With the filter coefficients determined, a determination is made as to whether constraint A is passed (step 820). In the described embodiment, constraint A is passed if the first tap coefficient magnitude (after monic tap) is less than 0.25. If constraint A is passed, the filter coefficients are compared to constraints B and C. In the described embodiment, constraint B considers whether the sum of the tap magnitudes is less than 3.0 and constraint C considers whether the max tap I or Q component is less than 2.0. If all of these constraints are met at steps 820 and 822, the filter taps are applied to FIR filter 14 of FIG. 7A.

If, however, constraint A is not met, all subsequent filter coefficient determination is performed using the constrained algorithm described above herein (block 824) and operation proceeds to decision block 826. If constraint A is met but constraints B and/or C are not met, operation proceeds to decision block 826 but the unconstrained algorithm continues to be employed. If a time out condition has occurred at decision block 826, e.g., four iterations, actual time constraint, etc., operation ends without determination of new filter coefficients. In such case, a previous set of filter coefficients are employed.

If the time out condition of decision block 826 has not occurred, the modified spectral characterization and/or filter tap settings produced may be modified using prior operations/prior solutions (block 828). Then, the noise floor is adjusted (block 830) and either the unmodified or the modified algorithm is employed to compute again the filter coefficients (block 818). The operations of FIG. 8 will continue to be performed for the current sample until either a solution is produced or a time out condition is met.

Figure 13:
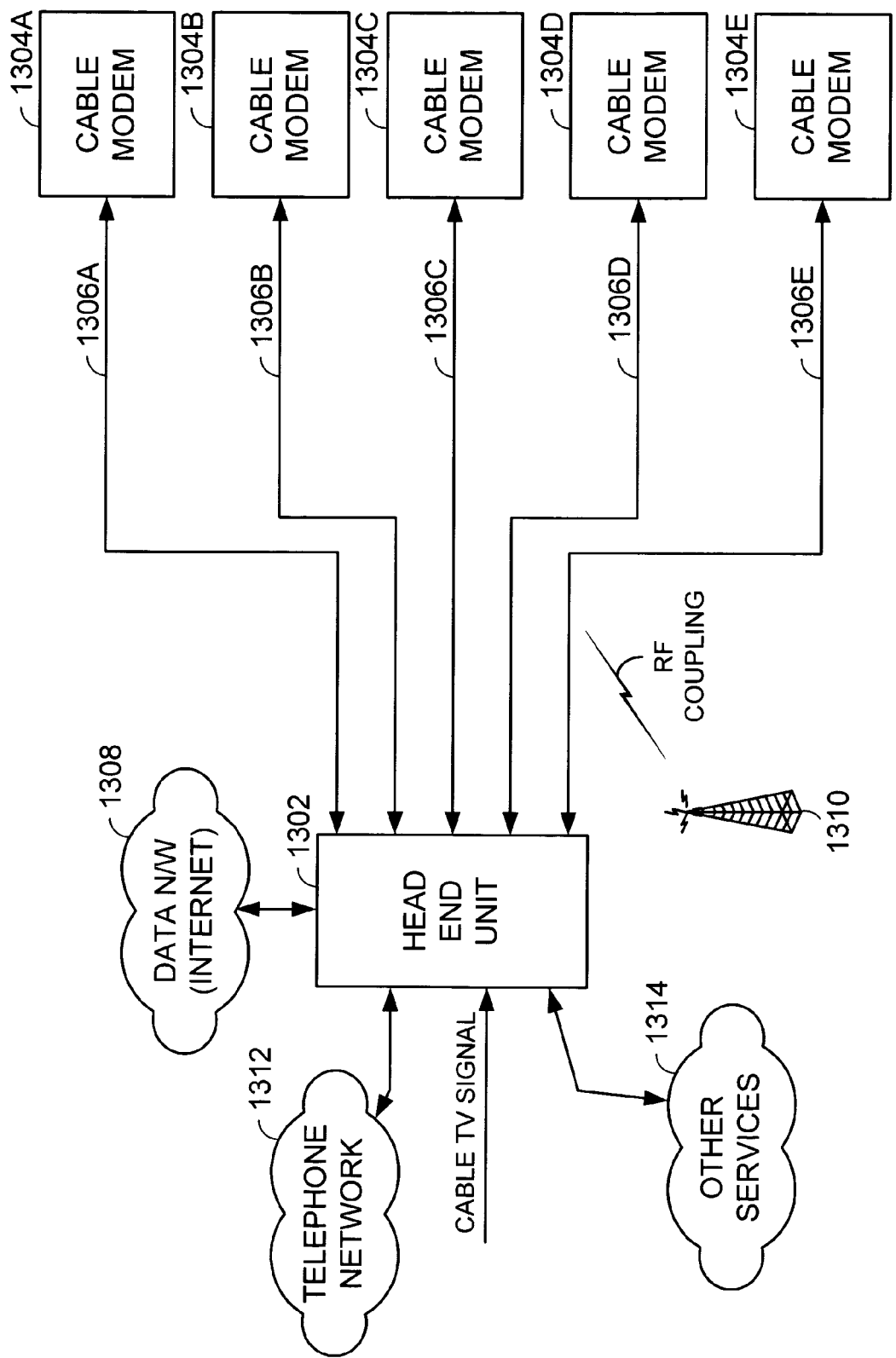
FIG. 13 is a system diagram illustrating the manner in which the present invention may be employed in a cable telecommunication system servicing high speed data communications.

FIG. 13 is a system diagram illustrating the manner in which the present invention may be employed in a cable telecommunication system servicing high speed data communications. In the cable telecommunication system, a head end unit 1302 couples to a plurality of cable modems 1304A-1304E via respective cable media 1306A-1306E. The head end unit 1302 services high speed data communications for the plurality of cable modems 1304A-1306E by acting as a gateway to a data network, such as the Internet 1308, a telephone network 1312, or other services network 1314. The head end unit 1302 also acts to distribute cable TV signals via the cable media 1306A-1306E to TV set top boxes (not shown). These cable TV signals therefore share the cable media 1306A-1306E with the high speed data communications also serviced by the head end unit 1302.

The head end unit 1302 services the high speed data communications within a frequency band of interest. Interfering signals may reside within this frequency band of interest. One source of these interfering signals may be radio frequency (RF) coupled from an RF source 1308. HAM radio operators, for example, produce radio frequency emissions in the frequency band of interest that may couple to the cable media 1306A-1306E as interfering signals. RF coupled interfering signals are typically intermittent. However, some interfering RF signals may be predicted. Further, the cable system itself may produce interfering signals via adjacent channel interference or via infrastructure components that operate in a faulty manner. These signals may be intermittent or may be somewhat continual, depending upon the cause of the interfering signals.

Thus, according to the present invention, the head end unit 1302 and/or the cable modems 1304A-1304E employ the filtering operations of the present invention to remove the interfering signals from the communication channel serviced by the cable media 1306A-1306E. By performing these operations, the communication channel will service data communications at a higher effective data rate, thus increasing the throughput supported by the cable telecommunication system.

In general, the described algorithms could be implemented in software that operates on a special purpose or general-purpose computer or in hardware. If the calculations necessary to compute the filter tap coefficients have not been completed by the next time interval T, the time interval is simply skipped and the algorithms operate on the narrow band interference energy in the following time interval T. With reference to FIG. 87 of application Ser. No. 09/710,238, filed on Nov. 9, 2000, the invention disclosed in this application comprises notch filter adjusting block 377.

Figure 14:
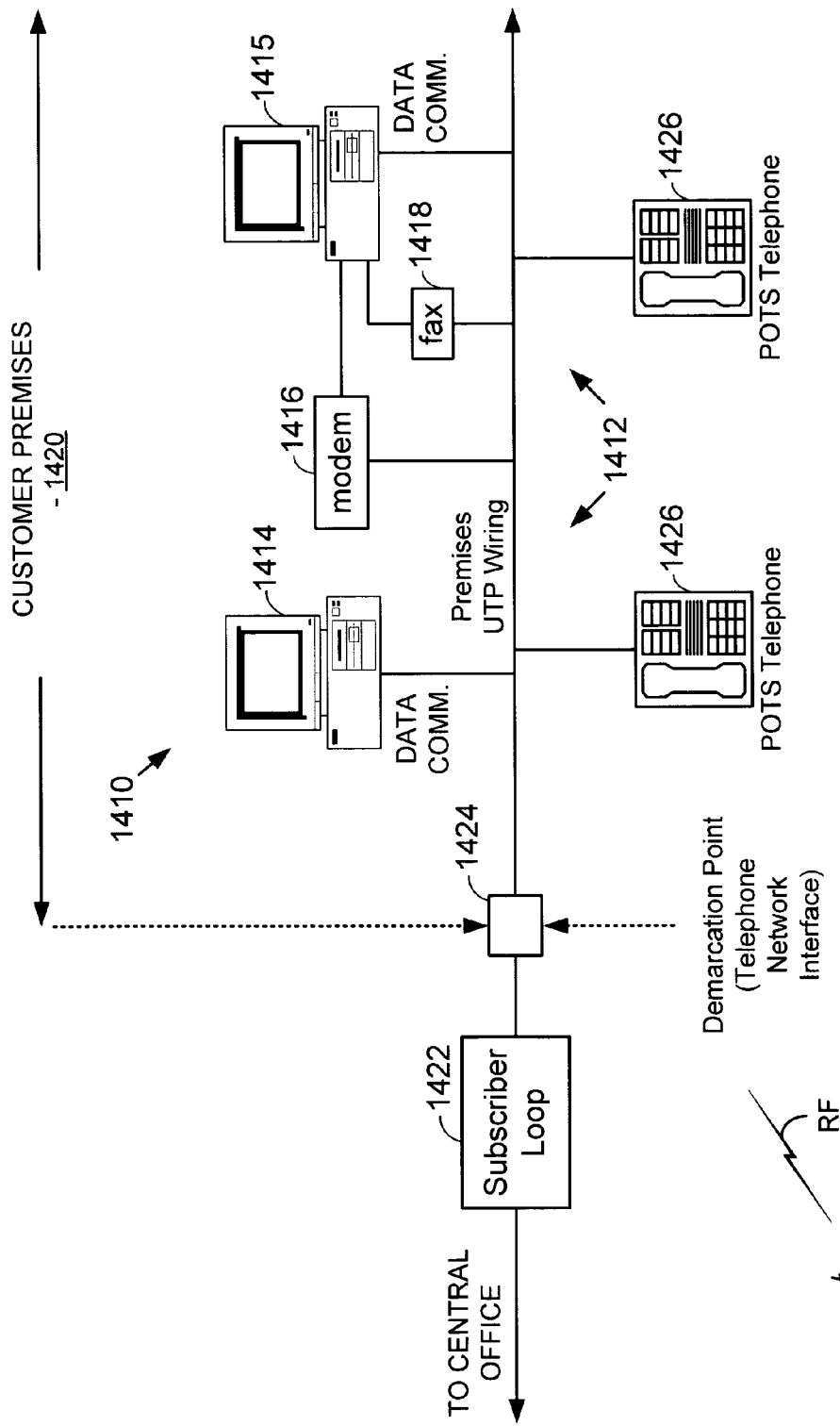
FIG. 14 is a system diagram illustrating a home phone line network within which the present invention may be implemented.

FIG. 14 is a system diagram illustrating a home phone line network 1410 within which the present invention may be implemented. The home phone line network 1410 includes existing residential telephone wiring 1412 that is used not only for conventional telephony communications but also for digital communications between digital communication components. Conventional telephony components include Plain Old Telephone System (POTS) telephones 1426, a modem 1416, and a FAX machine 1418. These devices interface with remote devices via the Public Switched Telephone Network (PSTN) and may also communicate with each other via the existing residential telephone wiring 1412. The operation of these devices is well known and will not be discussed further herein except as how they relate to the present invention. Digital communication components include computers 1414 and 1415 and may also include digital televisions, digital audio equipment, digital home automation equipment, surveillance equipment, and computer peripherals, printers, communication interfaces, etc., among other digital communication components. Because the digital communications components share the existing residential telephone wiring 1412 with the POTS devices, they concurrently couple signals to the existing residential telephone wiring 1412 along with the POTS devices.

The existing residential telephone wiring 1412 is typically conventional unshielded twisted pair (UTP) wiring that is routed internally in the walls of customer premises 1420 such that it terminates in various locations (e.g., rooms) within the customer premises 1420. The residential telephone wiring 1412 may be commonly terminated at one or more junction locations. A subscriber loop 1422 (also called a local loop) is a physical wiring link that directly connects the existing residential telephone wiring 1412 of the customer premises 1420 to the Telephone Company's Central Office through a telephone network interface 1424. The telephone network interface 1424 serves as a demarcation point between the inside and the outside of customer premises 1420.

A goal of the home phone line network 1410 is to reliably service data communications between digital communication components at as high a data rate as possible. Digital communications over existing residential telephone wiring 1412 is provided through frame-oriented link, media access and physical layer protocols that are typically implemented in accordance with the Home phone line networking Association (HPNA) implementation specifications. One particular commercial implementation of these standards is the iLine (trademark) family of controller products manufactured by Broadcom Corporation. Thus, the teachings of the present invention may be applied to these operating standards. However, in other embodiments of the present invention, other operating methodologies and/or standards may be employed.

In a home phone line network 1410, noise present in a frequency band(s) of interest of the digital communications may be significantly non-white, i.e., colored, where the PSD of the noise is not flat and successive noise samples are statistically correlated. The presence of non-white noise at a receiver, such as a receiver of computer 1414 can significantly reduce the data rate supported by the home phone line network 1410. One source of such colored noise is radio frequency interference (RFI), which can produce strong narrow-band interference within the frequency band(s) of interest for the digital communications. Other sources of colored noise are cross talk from other home phone line networks and interfering signals and/or noise produced by the POTS devices coupled to the home phone line network 1410, among others.

Whenever the noise at the input of a receiver is non-white, the noise power can be reduced by exploiting the correlation between successive samples. A whitening filter (also called a prediction error filter or ingress cancellation filter) reduces the noise power, in some cases to a lowest possible value and partially or fully cancels interfering signals. The whitening filter is trained during a period of time when no signal of interest is present at the input. Filter settings that are produced during the filter training are then employed to filter the input when a signal of interest is present. The whitening filter is a key component of an optimal decision feedback equalizer (DFE) based receiver that is employed in the digital interface of digital communication components such as the computers 1414 and 1415. With the input signal whitened, the data rate provided by the home phone line network 1410 increases. In an alternate embodiment, the filter settings may be determined while the signal of interest is present and altered to remove or suppress any filtering that may partially or fully attenuate the signal of interest.

Training a whitening filter in a stationary noise environment is generally known. However, in a home phone line network 1410 environment such as that depicted in FIG. 14, noise is generally time varying and is not always observable during a filter training period. In the home phone line network 1410 environment, various types of colored noise exist that are time varying. For example, cross talk that is introduced from other adjacent home phone line networks and by digital subscriber line (DSL) systems varies significantly over time. In addition, HAM radio RFI that wirelessly couples to the home phone line network 1410 wiring 1412, e.g., RFI from source 1310 also varies greatly with time. HAM radio RFI, which is usually confined to six narrow bands varies significantly over time due to its ON/OFF nature.

Other types of RFI occur at various frequency but are typically less frequent than the HAM radio RFI. Miscellaneous RFI may also be a function of time. Miscellaneous RFI may often times be characterized as a slowly time-varying tone. However, the miscellaneous RFI may be absent during an inter frame gap (IFG) that is used for filter training but slowly grow to high levels during the transmission of a data packet. It should be noted that the IFGs are small relative to how quickly the RFI changes and small relative to the packet length. Therefore, if sampling occurs at the IFGs, a major part of the RFI outside the IFGs can be missed.

Figure 15:
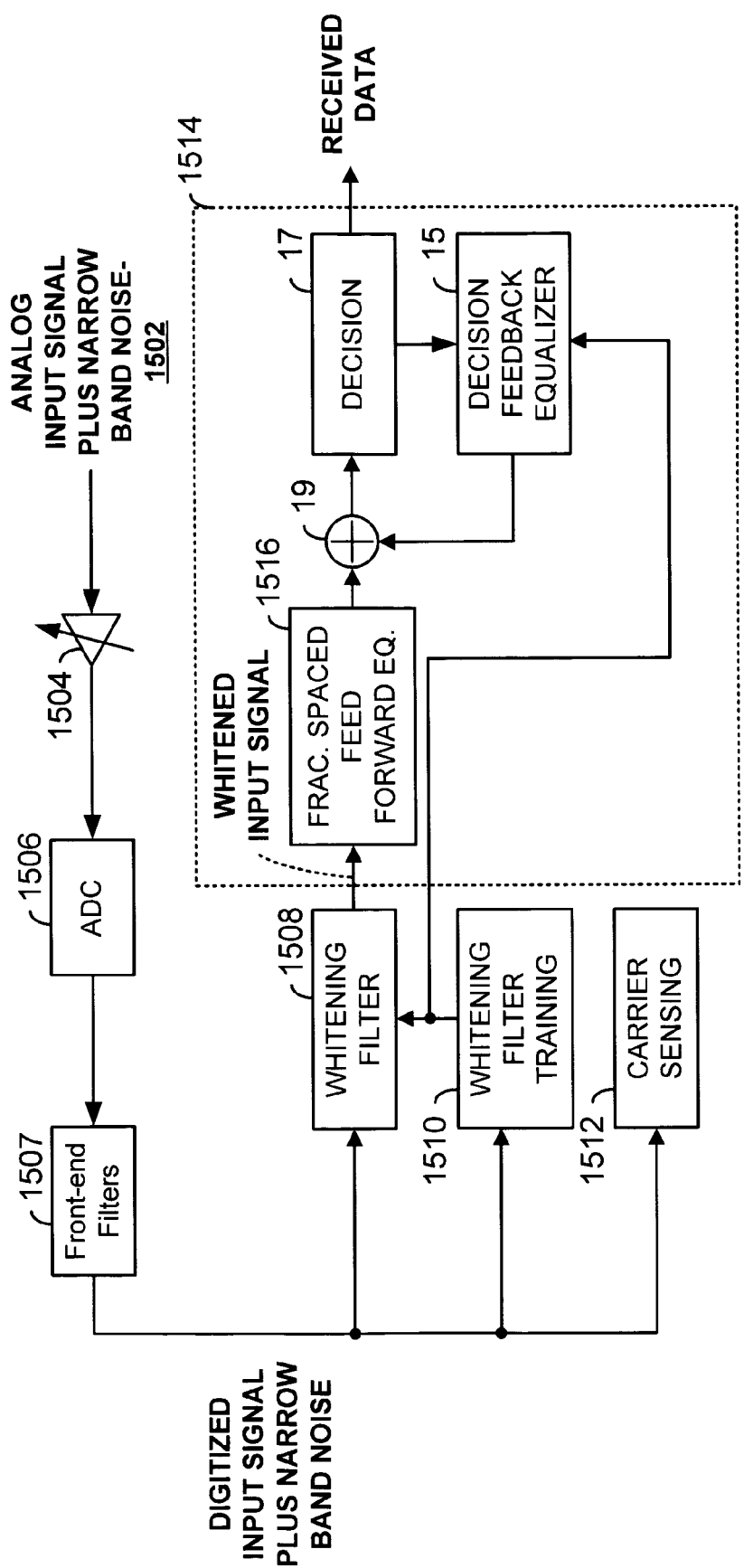
FIG. 15 illustrates a portion of a receiver of a home phone line network digital communication device that operates according to the present invention.

FIG. 15 is a block diagram illustrating an embodiment of a whiting filter used in accordance with the principles of the present invention. The whitening filter is deployed within a receiver section of a digital communication device, such as one that is contained within computer 1414 or 1415 of FIG. 14. Particularly, each of computers 1414 and 1415 of FIG. 14 include a home phone line network interface (that have both receiver and transmitter sections). The home phone line network interface allows the computers 1414 and 1415 to communicate with one another via the home phone line network 1410 of FIG. 14. These home phone line network interfaces may be contained in PC cards, e.g., PCI cards, ISA cards, PCMCIA cards, etc., in motherboard components, or in other components contained within, or adjacent computers 1414 and 1415. These home phone line interfaces also allow computers 1414 and 1415 to communicate with other digital communication devices that couple to the home phone line network 1410 via respective home phone line interfaces.

The receiver portion operates to receive data carried on a digital channel supported by the existing residential telephone wiring 1412 as shown in FIG. 14. In the receiver section, analog signals 1502 (containing digital data) are received at a variable gain amplifier/attenuator 1504 that either attenuates the analog signals 1502 or amplifies the analog signals 1502. These functions may be performed by multiple components in other embodiments, i.e., separate attenuator and amplifier. An analog to digital converter (ADC) 1506 then converts the attenuated analog input signal to an attenuated digitized input signal. The purpose of the amplifier/attenuator 1504 is adjust the analog signal so that it corresponds to the full input range of the ADC 1506. In such case, the ADC 1506 uses its complete range of resolution to convert the analog input signal to its equivalent digital output.

Front-end filter 1507 receives the digitized input signal from the ADC 1506 and removes out of band noise. Carrier sensing 1512 operation determines, in real time, whether or not there is a signal of interest (modulated carrier) on the UTP media and where the signal starts and stops. If a signal of interest is present, signal receipt operation is enabled. If no signal of interest is present, whitening filter training may be performed. During a whitening filter training operation, whitening filter training block 1510 operates to generate filter settings for the whitening filter. These filter settings are provided to the whitening filter 1508 and the whitening filter 1508 filters the digitized input signal (plus narrow band noise) during normal operations to produce a whitened input signal (with ingress attenuated).

The whitened input signal (with ingress attenuated) is then received by additional blocks in the receiver section of the corresponding device. These additional blocks then extract received data from the whitened input signal. Some of these blocks (referred to collectively as 1514) were previously described with reference to FIG. 7A. An additional illustrated block is a fractionally spaced feed forward equalizer block 1516 that receives the output from the whitening filter 1508 and provides input to summing node 19. Of course, the contents of block 1514 may differ in differing embodiments.

Figure 16:
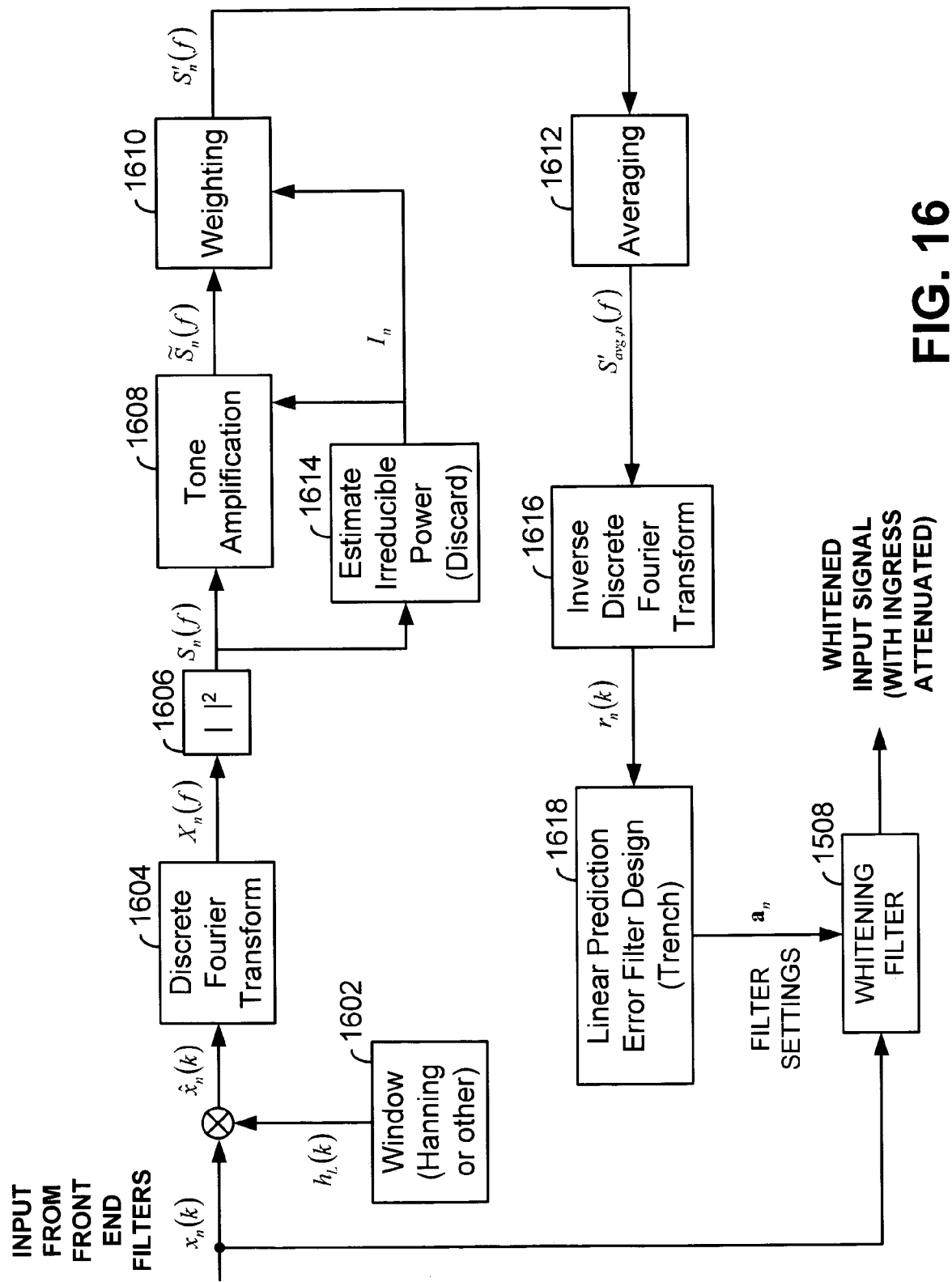
FIG. 16 is a block diagram illustrating operations employed to generate filter settings for the whitening filter of the receiver portion of FIG. 15.

FIG. 16 is a block diagram illustrating operations employed to generate filter settings for the whitening filter 1508 of the receiver portion of FIG. 15. Window (Hanning) function 1602, discrete Fourier transform (DFT) function 1604, magnitude squared function 1606, inverse discrete Fourier transform (IFFT) function 1616 and linear prediction error filter (Trench algorithm) function 1618 are generally known and/or have been previously described, and will not be further described with reference to FIG. 16.

The tone amplification function 1608, weighting function 1610, averaging function 1612, and estimate irreducible power function 1614 provide significant improvements over prior techniques. The output of linear prediction error filter design function 1618 provides the filter coefficients $a_n$ to the adaptive whitening filter 1508. The whitening filter 1508 receives input signals from the receiver front-end filter and produces a whitened input signal. The output of adaptive whitening filter 1508 is provided to the receiver blocks 1514 as described with reference to FIG. 15 for extraction of digital information contained therein.

Notations employed with reference to FIG. 15 to describe the various signals received and produced are as follows:

n denotes the time index of a noise observation window.

L is the number of samples in the noise observation window.

$x_n(k)$ is the input signal for the noise observation window n, for k=0, . . . , L−1.

M is the number of taps produced as filter settings by the filter training operations, e.g., the number of taps in a corresponding whitening filter is M+1

In one particular embodiment, 256 samples are taken in a noise observation window and 15 taps are computed.

As a first operation in the filter training sequence the L samples of the input taken at noise observation window n that are received from the front end filter. These samples are represented as $x_n(k)$ for k=0, . . . , L−1. A Hanning window is then applied at window function 1602 to produced windowed samples $\hat{x}_n(k)$ according to the following:

$$\hat{x}_n(k) = x_n(k) \cdot h_L(k), \text{ where } h_L(k) \text{ is a Hanning window of length L}$$

Then, the Discrete Fourier Transform of the windowed samples, $\hat{x}_n(k)$, is taken by discrete Fourier transform (DFT) function 1604 to produce a spectral characterization of the samples taken during the noise observation window, n. This spectral characterization includes a plurality of spectral components of the windowed samples, such spectral components $X_n(f)$ produced according to $X_n(f) = DFT\{\hat{x}_n(k)\}$.

The DFT of the samples thus represents a spectral characterization of the input samples at noise observation window, n. Then, the Power Spectral Density (PSD) of the spectral characterization is performed at PSD block 1606 to compute the instantaneous PSD for noise observation window, n, according to:

$$S_n(f) = |X_n(f)|^2$$

The PSD produced is thus a function of frequency (f) for the noise observation window, n, sample set. Thus, the PSD for the time n sample set also represents the spectral characterization of the sampled signal (without signal of interest).

With the PSD computed for noise observation window, n, the Estimate Irreducible Power block 1614 then estimates the Irreducible Power for the sample interval. The Irreducible Power is a calculated value that represents a PSD for the noise observation window, n, that has been optimally filtered to remove all interfering signals. In other words, the Irreducible Power represents the lowest possible noise power that could be produced using any whitening filter to whiten the sampled spectral characterization for the noise observation window, n. Accordingly, the Irreducible Power is determined by:

$$I_n^{f_{lo}, f_{hi}} \equiv 2^{\left(\frac{1}{f_{hi}-f_{lo}+1} \sum_{f=f_{lo}}^{f_{hi}} \log_2(S_n(f))\right)}$$

where $f_{hi}$ and $f_{lo}$ are predefined parameters corresponding to the upper and lower band edges of the spectrum.

The Irreducible Power Estimation may also be used to determine whether the samples of the noise observation window, n, are valid. According to this operation, $$I_n^{4,10} \text{ and } I_n^{4,21}$$

are computed for the 4-10 MHz band and the 4-21 MHz band, respectively. The calculations are performed for these two frequency bands because, in the described embodiment, the signal of interest may occupy either or both of the 4-10 MHz band and the 4-21 MHz band. In other embodiments in which the signal of interest is known to occupy a single band, the irreducible power may be computed for the single known band occupied by the signal of interest.

$$I_{max}^{4,10} \text{ and } I_{max}^{4,21}$$

are predefined parameters representing the thresholds for classifying the noise measurements as valid signals. If $$I_n^{4,10} > I_{max}^{4,10} \text{ or } I_n^{4,21} > I_{max}^{4,21},$$

then the spectrum will be discarded and the current filter training sequence will be terminated. Such threshold operations protect the whitening filter from possible carrier sensing failures, i.e., determining filter settings during a period of time when the signal of interest is present.

In the present embodiment, because the signal of interest may occupy either/both of the 4-10 MHz band and the 4-21 MHz band, a compromise pass band irreducible power is employed to represent the Irreducible Power. In such case, the compromise pass band irreducible power is calculated according to:

$$I_n = \frac{I_n^{4,10} + I_n^{4,21}}{2}$$

At Tone Amplification Block 1608, each spectral component of the output of Spectral Density Determination block 1606 is selectively amplified by a particular gain factor. Tone amplification is motivated by a combination of two factors. First, because of the relatively short noise observation windows employed for filter training, the peaks of an interfering signal, e.g., RFI, may never be seen during the observation window. In such case, the interfering signal may be 10 dB to 20 dB above its observed value during packet data communications. Second, when a new interfering signal appears, it is insignificant in the long-term average. The concept of Tone Amplification is such that increasing the depth of a null costs very little in terms of mean square error (MSE), but sometimes has huge benefits when the corresponding interfering signal(s) is present. With the specified Tone Amplification algorithm, the PSD amplification is a nonlinear function of the ratio of the PSD to the irreducible power. The total amount of amplification (in dB-Hz) is limited, thus limiting the total MSE cost.

In selecting a gain factor for each spectral component at the Tone Amplification block 1608, $S_n(f)$, the following equations/methodology is employed:

First, a set of rules is established, such that.
1. $T_1$ is set to be the specified minimum threshold for tone amplification;
2. $T_2$ is set to be the specified threshold for maximum tone amplification;
3. $K_\alpha$ is a parameter affecting the amount of tone amplification (nominally set to unity);
4. $L_1$ is set to be the specified limit on the total amount of amplification across all tones; and With these rules established, the following equations are employed to determine the amplification to be applied to each tone $$\alpha_1(f) = K_\alpha \max(0, \min(T_2, \log_2(S_n(f)) - \log_2(I_n)) - T_1)$$

$$\alpha_2(f) = \frac{\alpha_1(f) L_1}{\max\left(L_1, \sum_f \alpha_1(f)\right)}$$

$$\tilde{S}_n(f) = S_n(f) 2^{\alpha_2(f)}$$

Thus, after completion of these operations, each spectral component of the spectral characterization for the noise observation window, n, is adjusted by a corresponding gain factor. Resultantly, a modified spectral characterization is produced for the noise observation window, n. In one embodiment of these operations, $T_1$=6.64 (20 dB), $T_2$=9.96 (30 dB), $L_1$=6.64 (20 dB), and $K_\alpha$=1.

With Tone Amplification completed at Tone Amplification block 1608, the modified spectral characteristics are further operated on by the weighting function 1610. The weighting function 1610 considers the modified spectral components of the present noise observation window, n, and further modifies the modified spectral components based upon corresponding spectral components of prior noise windows, e.g., n−1, n−2, . . . , n−k.

With regard to weighting, uniform weighting across all noise observation windows, n, n−1, n−2, . . . , n−k, would minimize the mean-squared output noise power across all packets. However, any large impulse event would dominate the average, optimizing the whitening filter for a case where there is little to be gained, at the expense of low-level RFI cases, where there may be much to be gained. A better method involves minimizing the mean-squared ratio of the output noise power to the irreducible noise power. Such technique optimizes the whitening filter for the cases where there is the most to be gained. Large impulse events are de-weighted and very low-noise events are weighted higher. However, this technique is undesirable because better performance in lower-than-average noise cases does not enable selection of higher rates.

Thus, weighting according to the present invention minimizes the mean-squared ratio of the output noise power to the sum of the irreducible noise power and the average irreducible noise power. This weighting operation de-weights events with above-average irreducible noise power without over-weighting events with below average irreducible noise power. In performing this weighting function 1610, a time constant τ is employed to perform the weighting according to the following equations:

$$I_{avg,n} = 2^{(\log_2(I_{avg,n-1})+(\log_2(I_n)-\log_2(I_{avg,n-1}))/\tau)}$$

$$S'_n(f) = \frac{\tilde{S}_n(f)}{I_{avg,n} + I_n}$$

The averaging function 1612 receives the output from the weighting function 1610 and uses the following equation to produce its output:

$$S'_{avg,n}(f) = S'_{avg,n-1}(f) + \frac{(S'_n(f) - S'_{avg,n-1}(f))}{\tau}$$

The Inverse Discrete Fourier Transform function 1616 receives the output from the Averaging function 1612 and operates to produce components of an autocorrelation matrix according to:

$$r_n(k) = IDFT\{S'_{avg,n}\}, \text{ needed for } k = 0 \ldots M$$

Where the autocorrelation matrix is defined as:

$$R_n \equiv \begin{bmatrix} r_n(0) & r_n(1) & \ldots & r_n(M-1) \\ r_n^*(1) & r_n(0) & \ldots & r_n(M-2) \\ \vdots & \vdots & \ddots & \vdots \\ r_n^*(M-1) & r_n^*(M-2) & \ldots & r_n(0) \end{bmatrix}$$

From the components of the auto correlation matrix, the cross-correlation vector may be defined as:

$$r_n \equiv \begin{bmatrix} r_n^*(1) \\ r_n^*(2) \\ \vdots \\ r_n^*(M) \end{bmatrix}$$

Using the cross-correlation vector, the Linear Prediction Error Filter Design function may be determined according to:

$$w_n = R_n^{-1} r_n$$

Such operation may be efficiently performed using the Trench algorithm, as was previously described herein, using M·(M−1) complex multiplication operations. Resultantly, the filter coefficients produced for the whitening filter (forward prediction-error filter) are defined by:

$$a_n = \begin{bmatrix} 1 \\ -w_n \end{bmatrix}$$

These filter coefficients (or tap settings) are then applied to the whitening filter 1508 during subsequent periods of operation of the corresponding receiver section.

Figure 17:
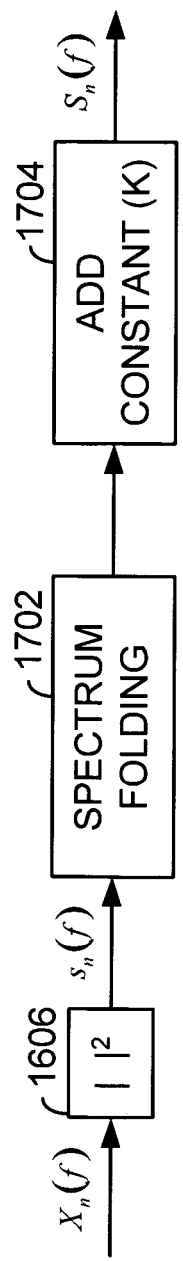
FIG. 17 is a block diagram illustrating additional operations that may optionally be employed to produce a modified spectral characterization according to the present invention.

FIG. 17 is a block diagram illustrating additional operations that may optionally be employed to produce a modified spectral characterization according to the present invention. The additional operations of FIG. 17 are performed upon the spectral components of the spectral characterization after the PSD block 1606 has performed its operations. In the operations of FIG. 17, the PSD block 1606 produces a plurality of spectral components $s_n(f)$. These spectral components $s_n(f)$ are received by the spectrum folding block 1702. Then, the modified spectral components produced by the spectrum folding block 1702 are received by add constant block 1704. The output of the add constant block 1704 is a modified spectral characterization represented by the components $S_n(f)$ that are applied to the Tone Amplification block 1608 and the Estimate Irreducible Power block 1614.

Figure 18A:
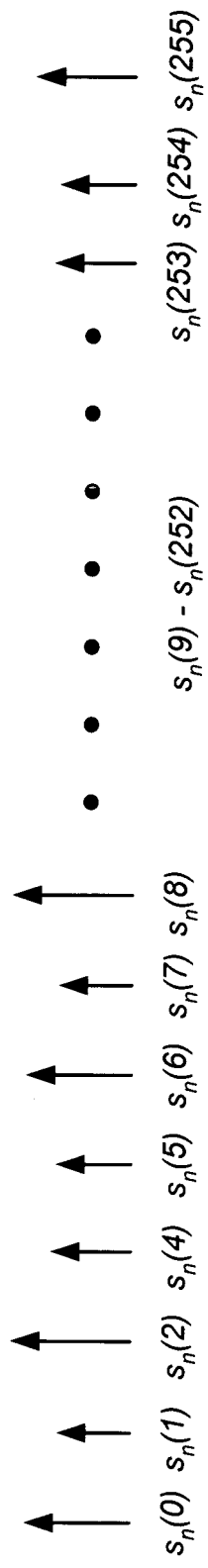
FIGS. 18A and 18B illustrate spectral components operated upon and produced according to the operations of FIG. 17.
Figure 18B:
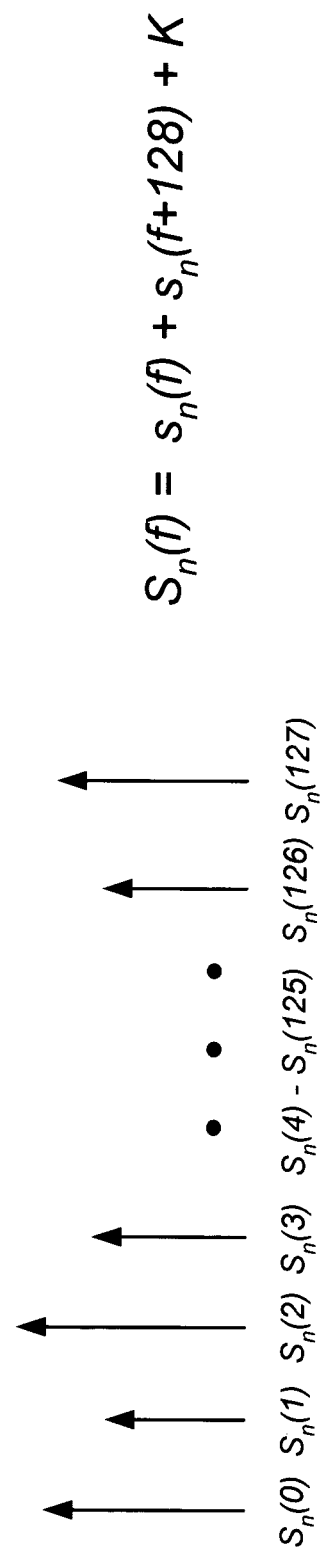

FIGS. 18A and 18B illustrate spectral components operated upon and produced according to the operations of FIG. 17. In the particular embodiment illustrated, the spectral characterization of the samples taken during noise observation window, n, and produced by Discrete Fourier Transform block 1604 includes 256 spectral components, denoted as $X_n(f)$, where f=0, 1, 2, ..., 255. Thus, in the embodiment of FIG. 17, the PSD block 1606 produces 256 spectral components for noise observation window, n, denoted as $s_n(f)$, where f=0, 1, 2, ..., 255. In the spectrum folding block 1702, the spectrum is folded in half such that individual spectral components are added together. In the particular operation illustrated, spectrum folding block 1702 adds $s_n(f)$ and $s_n(f+128)$ for f=0, 1, 2, ..., 127.

Then, add constant block 1704 adds a constant to each spectral component of the folded spectrum produced by spectrum folding block 1702 to produce modified spectral components $S_n(f)$, where f=0, 1, 2, ..., 127. The combination of the operations of spectrum folding block 1702 and add constant block 1704 that produce the output $S_n(f)$ may be expressed as:

$$S_n(f) = s_n(f) + s_n(f+128) + K \text{ for } f=0, 1, 2, \ldots, 127.$$

When the spectrum folding operations of block 1702 are performed on the spectral characterization, corresponding operations must be performed in the whitening filter 1508 to compensate for the reduced bandwidth of the folded spectrum. Because the folded spectral characterization has one-half of the bandwidth of the spectral characterization, filter settings applied to the filter must be altered to compensate for the reduced bandwidth. In one compensating operation, the filter settings are applied to alternate taps of the filter, with remaining taps set to zero. A byproduct of frequency folding is that two notches will be produced for every spectral component present in the spectral characterization that is filtered. However, these additional notches do not significantly adversely affect the operation of the whitening filter 1508 because these notches fall outside of the band of the signal of interest. Further, because spectrum folding significantly reduces the computations required to compute the filter tap settings, the computational gains far outweigh the operational drawbacks. However, spectrum folding only works when the bandwidth of the sampled signal is approximately equal to twice the bandwidth of the signal of interest. In such case, the bandwidth of the folded spectrum will then be approximately equal to the bandwidth of the signal of interest.

As an alternate embodiment of the operations of FIG. 17, the add constant block 1704 could be performed prior to the spectrum folding block 1702. In such case, the constant K added in block 1704 would be reduced by one-half since the constant is added prior to the spectrum folding block 1702.

As was previously related, the description of FIGS. 7A through 13 related to the manner in which the present invention may be applied to a cable modem application. Further, the description of FIGS. 14 through 18B related to the manner in which the present invention may be applied to a home networking application. The principles described with respect to each of these embodiments could easily be applied to other networking embodiments, e.g., the concepts described in FIGS. 7A through 13 could be applied to a home networking application and the concepts described in FIGS. 14 through 18B may be applied to a cable modem application. Further, all of these concepts and teachings could be applied to any networking application in which noise whitening and ingress cancellation is desirable.

Terminology and character selection that was employed in FIGS. 7A through 13 was partially inconsistent with terminology and character selection employed in FIGS. 14 through 18B. Thus, the reader should not necessarily have concluded that the characters and terminology of FIGS. 7A through 13 were consistent with the terminology of FIGS. 14 through 18B, even though they were in a number of instances.

The invention disclosed herein is susceptible to various modifications and alternative forms. Specific embodiments therefor have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

The invention claimed is:

1. In a communication network, a method for whitening colored noise present at the input of a receiver, the method comprising:
    sampling colored noise present at the input of the receiver during a sampling interval to produce a sampled signal;
    spectrally characterizing the sampled signal across a frequency band of interest to produce a spectral characterization of the sampled signal;
    modifying the spectral characterization of the sampled signal to produce a modified spectral characterization, wherein:
        the modified spectral characterization is based upon the spectral characterization and prior spectral characterizations; and
    wherein in modifying the spectral characterization, spectral components of the spectral characterization are averaged with corresponding spectral components of prior spectral characterizations;
    generating filter settings based upon the modified spectral characterization; and
    when a signal of interest and colored noise are present at the input of the receiver, filtering the input using the filter settings to whiten the colored noise at the input.

2. The method of claim 1, wherein in modifying the spectral characterization of the sampled signal to produce the modified spectral characterization, a plurality of spectral components of the spectral characterization are modified.

3. The method of claim 1, wherein in modifying the spectral characterization of the sampled signal to produce the modified spectral characterization, the modified spectral characterization is based upon the spectral characterization and at least one of:
    a characterization of the noise power of the spectral characterization;
    a prior spectral characterization; and
    a characterization of the noise power of the prior spectral characterization.

4. In a communication network, a method for whitening colored noise present at the input of a receiver, the method comprising:
    sampling colored noise present at the input of the receiver during a sampling interval to produce a sampled signal;
    spectrally characterizing the sampled signal across a frequency band of interest to produce a spectral characterization of the sampled signal;
    discarding the spectral characterization when a characterization of the noise power of the spectral characterization exceeds a threshold;
    modifying the spectral characterization of the sampled signal to produce a modified spectral characterization by folding the spectral characterization to decrease the bandwidth of the spectral characterization;
    generating filter settings based upon the modified spectral characterization; and
    when a signal of interest and colored noise are present at the input of the receiver, filtering the input using the filter settings to whiten the colored noise at the input.

5. The method of claim 4, wherein in modifying the spectral characterization of the sampled signal to produce the modified spectral characterization, a plurality of spectral components of the spectral characterization are modified.

6. The method of claim 4, wherein modifying the spectral characterization of the sampled signal to produce the modified spectral characterization further includes amplifying each of the plurality of spectral components of the spectral characterization by one of a plurality of gain factors.

7. The method of claim 6, further comprising applying a gain factor to a particular spectral component, the gain factor based upon the magnitude of the spectral component.

8. The method of claim 7, wherein the gain factor to be applied to the particular spectral component is also based upon the magnitudes of other of the spectral components of the spectral characterization.

9. The method of claim 7, wherein the gain factor to be applied to the particular spectral component is also based upon a characterization of the noise power of the spectral characterization.

10. The method of claim 4, wherein modifying the spectral characterization of the sampled signal to produce the modified spectral characterization is further based upon the spectral characterization and at least one of:
    a characterization of the noise power of the spectral characterization;
    a prior spectral characterization; and
    a characterization of the noise power of the prior spectral characterization.

11. The method of claim 4, wherein modifying the spectral characterization of the sampled signal to produce the modified spectral characterization is further based upon:
    a characterization of the noise power of the spectral characterization and characterizations of the noise power of the prior spectral characterizations; and
    when the characterization of the noise power of the spectral characterization is above average as compared to characterizations of the noise power of prior spectral characterizations, the spectral components of the spectral characterization are de-weighted in determining the spectral components of the modified spectral characterization.

12. The method of claim 4, further comprising modifying the filter settings to compensate for the folding of the spectral characterization.

13. The method of claim 4, wherein the sampling is performed when the signal of interest is not present at the input of the receiver.

14. The method of claim 4, wherein:
the sampling is performed while the signal of interest is present at the input of the receiver; and
the method further comprises removing the signal of interest from the sampled signal.

15. The method of claim 4, wherein modifying the spectral characterization of the sampled signal to produce a modified spectral characterization is performed in the frequency domain.

16. The method of claim 4, wherein modifying the spectral characterization of the sampled signal to produce a modified spectral characterization is performed in the time domain.

17. The method of claim 4, wherein modifying the spectral characterization of the sampled signal to produce a modified spectral characterization is performed both in the frequency domain and in the time domain.

18. The method of claim 4, further comprising discarding the spectral characterization when a characterization of the noise power of the spectral characterization exceeds a threshold.

19. The method of claim 4, wherein the network comprises a home phone line network.

* * * * *